United States Patent
Kim et al.

(10) Patent No.: US 9,959,036 B2
(45) Date of Patent: May 1, 2018

(54) MOBILE TERMINAL AND CONTROLLING METHOD THEREOF

(71) Applicant: LG ELECTRONICS INC., Seoul (KR)

(72) Inventors: Moonkyung Kim, Seoul (KR); Jihye Ham, Seoul (KR); Harim Jang, Seoul (KR); Minsoo Park, Seoul (KR); Hyoungmi Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 885 days.

(21) Appl. No.: 14/500,503

(22) Filed: Sep. 29, 2014

(65) Prior Publication Data

US 2015/0020036 A1 Jan. 15, 2015

Related U.S. Application Data

(62) Division of application No. 13/542,454, filed on Jul. 5, 2012, now Pat. No. 8,881,062.

(30) Foreign Application Priority Data

Nov. 29, 2011 (KR) .................. 10-2011-0126064

(51) Int. Cl.
  *G06F 3/0488* (2013.01)
  *G06F 3/0481* (2013.01)
  (Continued)

(52) U.S. Cl.
  CPC ........ *G06F 3/04883* (2013.01); *G06F 3/0484* (2013.01); *G06F 3/04817* (2013.01); *G06F 3/04842* (2013.01); *G06F 9/4443* (2013.01)

(58) Field of Classification Search
  CPC ............ G06F 3/04883; G06F 3/04817; G06F 3/0484; G06F 3/04842; G06F 9/4443
  (Continued)

(56) References Cited

U.S. PATENT DOCUMENTS 7,424,686 B2  9/2008 Beam et al.
7,685,530 B2  3/2010 Sherrard et al.
(Continued)

FOREIGN PATENT DOCUMENTS

CN  101400060 A  4/2009
CN  101504601 A  8/2009
(Continued)

*Primary Examiner* — David Phantana-angkool
(74) *Attorney, Agent, or Firm* — Birch, Stewart, Kolasch & Birch, LLP

(57) ABSTRACT

A mobile terminal including a touchscreen; a wireless communication unit; a memory configured to store a specific application; and a controller configured to display a first object related to the specific application, the first object having a first size, in which the specific application can be executed in response to a first touch gesture on the first object, in response to a second touch gesture with respect to the displayed first object, display an object indicator indicating that the first object can be changed into a second object related to the specific application, the second object having a second size, and in response to a third touch gesture with respect to the object indicator, change the displayed first object into the second object such that the first object is visually transformed into the second object.

36 Claims, 18 Drawing Sheets

(51) Int. Cl.
*G06F 3/0484* (2013.01)
*G06F 9/44* (2018.01)

(58) Field of Classification Search
USPC .......................................................... 715/835
See application file for complete search history.

(56) References Cited

U.S. PATENT DOCUMENTS

| | | | |
|---|---|---|---|
| 8,217,905 B2 | 7/2012 | Kim et al. | |
| 8,442,600 B1 | 5/2013 | Tseng | |
| 8,607,167 B2 | 12/2013 | Matas et al. | |
| 8,698,762 B2 | 4/2014 | Wagner et al. | |
| 8,812,994 B2* | 8/2014 | Seymour | G06F 3/0487 345/173 |
| 9,430,084 B2* | 8/2016 | Kim | G06F 3/0412 |
| D778,942 S* | 2/2017 | Coffman | D14/486 |
| 9,607,141 B2* | 3/2017 | Kim | G06F 21/36 |
| 9,690,476 B2* | 6/2017 | Shirzadi | G06F 3/04883 |
| 9,710,079 B2* | 7/2017 | Yoon | G06F 3/041 |
| 9,733,827 B2* | 8/2017 | Borovsky | G06F 3/04883 |
| 9,747,002 B2* | 8/2017 | Yakishyn | G06F 3/0483 |
| 9,747,003 B2* | 8/2017 | Lazaridis | G06F 3/0483 |
| 9,760,176 B2* | 9/2017 | Sundaramurthy | G06F 3/017 |
| 9,760,201 B2* | 9/2017 | Fang | G06F 3/0488 |
| 9,772,605 B2* | 9/2017 | Shim | G04B 47/063 |
| 9,773,024 B2* | 9/2017 | Lee | G06F 17/30274 |
| 9,804,742 B2* | 10/2017 | Lee | G06F 3/0482 |
| 9,830,049 B2* | 11/2017 | Martin | G06F 3/0483 |
| 9,841,886 B2* | 12/2017 | Nabeshima | G06F 3/0485 |
| 2006/0015818 A1 | 1/2006 | Chaudhri et al. | |
| 2008/0307385 A1 | 12/2008 | Dreiling et al. | |
| 2009/0063972 A1 | 3/2009 | Ma et al. | |
| 2009/0094554 A1 | 4/2009 | Karstens | |
| 2009/0327961 A1 | 12/2009 | De Vorchik et al. | |
| 2010/0001967 A1* | 1/2010 | Yoo | G06F 3/0488 345/173 |
| 2010/0088641 A1 | 4/2010 | Choi | |
| 2010/0185986 A1 | 7/2010 | Quintanilla et al. | |
| 2010/0283743 A1 | 11/2010 | Coddington | |
| 2010/0309149 A1 | 12/2010 | Blumenberg et al. | |
| 2011/0041102 A1* | 2/2011 | Kim | G06F 3/04883 715/863 |
| 2011/0167380 A1* | 7/2011 | Stallings | G06F 3/0482 715/784 |
| 2011/0210933 A1 | 9/2011 | Forstall | |
| 2011/0294467 A1 | 12/2011 | Kim et al. | |
| 2012/0054663 A1 | 3/2012 | Baek et al. | |
| 2012/0192110 A1 | 7/2012 | Wu | |
| 2013/0014006 A1 | 1/2013 | Abellera et al. | |
| 2013/0076660 A1 | 3/2013 | Reeves et al. | |
| 2013/0139109 A1 | 5/2013 | Kim et al. | |
| 2014/0066131 A1 | 3/2014 | Yoo | |
| 2014/0165006 A1 | 6/2014 | Chaudhri et al. | |
| 2017/0017359 A1* | 1/2017 | Choi | G06F 3/0482 |

FOREIGN PATENT DOCUMENTS

| | | |
|---|---|---|
| CN | 101625620 A | 1/2010 |
| CN | 102033710 A | 4/2011 |
| EP | 2003842 A1 | 12/2008 |
| EP | 2 144 148 A2 | 1/2010 |
| EP | 2 192 474 A2 | 6/2010 |
| EP | 2 372 988 A2 | 10/2011 |

* cited by examiner

FIG. 18
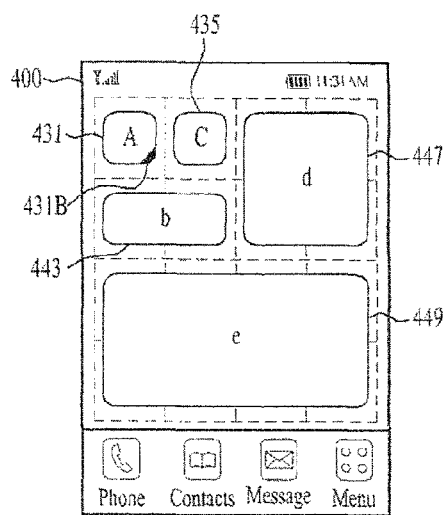
(18-1)
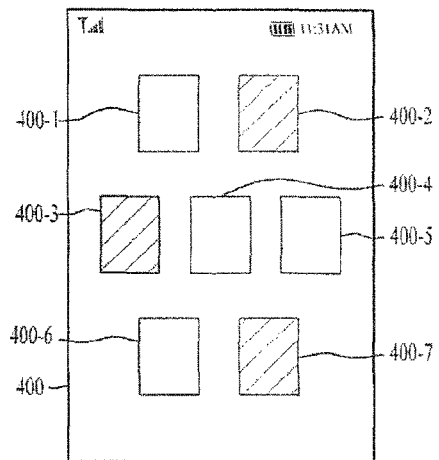
(18-2)
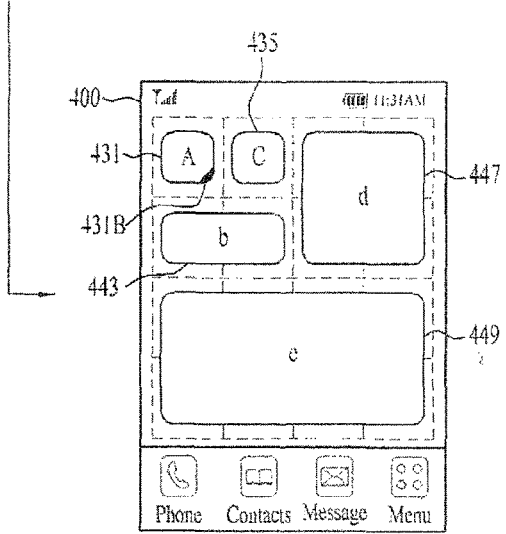
(18-3)

MOBILE TERMINAL AND CONTROLLING METHOD THEREOF

This application is a divisional of U.S. patent application Ser. No. 13/542,454, filed on Jul. 5, 2012, which claims the benefit of Korean Patent Application No. 10-2011-0126064, filed on Nov. 29, 2011, the contents of which is hereby incorporated by reference herein in their entirety.

BACKGROUND OF THE INVENTION

Field of the Invention

Embodiments of the present invention are related to a mobile terminal, and more particularly, to a mobile terminal and a method of controlling a mobile terminal. Although features disclosed herein are suitable for a wide scope of applications, they are particularly suitable for configuring a terminal in view of enhancing user convenience.

Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals. Further, the mobile terminals can be further classified into handheld terminals and vehicle mount terminals.

Recently, a smart phone has become very popular. Since most of users want more applications installed on smart phones than those provided by manufacturers, the user usually installs a desired application on their smart phone by accessing an on-line application market and then downloading the desired application from the accessed on-line application market.

When the prescribed application is downloaded, an application activating icon and an application widget related to the desired application are downloaded to the corresponding smart phone. In particular, if the number of the downloaded applications increases, the number of the downloaded icons and the downloaded widgets increases in proportion to the rising number of the downloaded applications.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, by which, when a prescribed application is downloaded together with an application activating icon and an application widget related to the prescribed application, the downloaded icons and widgets can be created on a display unit with ease in consideration of user's convenience.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to the present invention may include a touchscreen, a memory configured to store a specific application and a $1^{st}$ object and a $2^{nd}$ object for the specific application, and a controller configured to control the $1^{st}$ object to be displayed on the touchscreen, and when a preset touch gesture is performed on the $1^{st}$ object displayed on a home screen of the touchscreen, control the $2^{nd}$ object to be displayed on the home screen.

In another aspect of the present invention, a mobile terminal according to the present invention may include a touchscreen, a memory configured to store a specific folder and a $1^{st}$ folder object and a $2^{nd}$ folder object for the specific folder, and a controller configured to control a $1^{st}$ folder icon to be displayed on the touchscreen, when a $1^{st}$ touch gesture is performed on the $1^{st}$ folder object, control the specific folder to be opened, and when a $2^{nd}$ touch gesture is performed on the $1^{st}$ folder object, control the $2^{nd}$ folder object to be displayed in a manner of changing the $1^{st}$ folder object into the $2^{nd}$ folder object.

In another aspect of the present invention, a method of controlling a mobile terminal according to the present invention may include storing a specific application and a $1^{st}$ object and a $2^{nd}$ object for the specific application, displaying the $1^{st}$ object on a home screen of a touchscreen, and when a preset touch gesture is performed on the $1^{st}$ object displayed on the home screen, displaying the $2^{nd}$ object on the home screen.

In a further aspect of the present invention, A computer readable medium comprises commands encoded therein, which when executed in a mobile terminal, cause the terminal to store a specific application and a $1^{st}$ object and a $2^{nd}$ object for the specific application, display the $1^{st}$ object on a home screen of a touchscreen, and when a preset touch gesture is performed on the $1^{st}$ object displayed on the home screen, display the $2^{nd}$ object on the home screen.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIGS. 14 to 18 are diagrams of display screen configurations to implement a method of controlling a mobile terminal according to a further embodiment of the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

Features of embodiments of the present invention are applicable to various types of terminals. Examples of such terminals include mobile terminals, such as mobile phones, user equipment, smart phones, mobile computers, digital broadcast terminals, personal digital assistants, portable multimedia players (PMP) and navigators. However, by way of non-limiting example only, further description will be with regard to a mobile terminal 100, and it should be noted that such teachings may apply equally to other types of terminals such as digital TV, desktop computers and so on.

Figure 1:
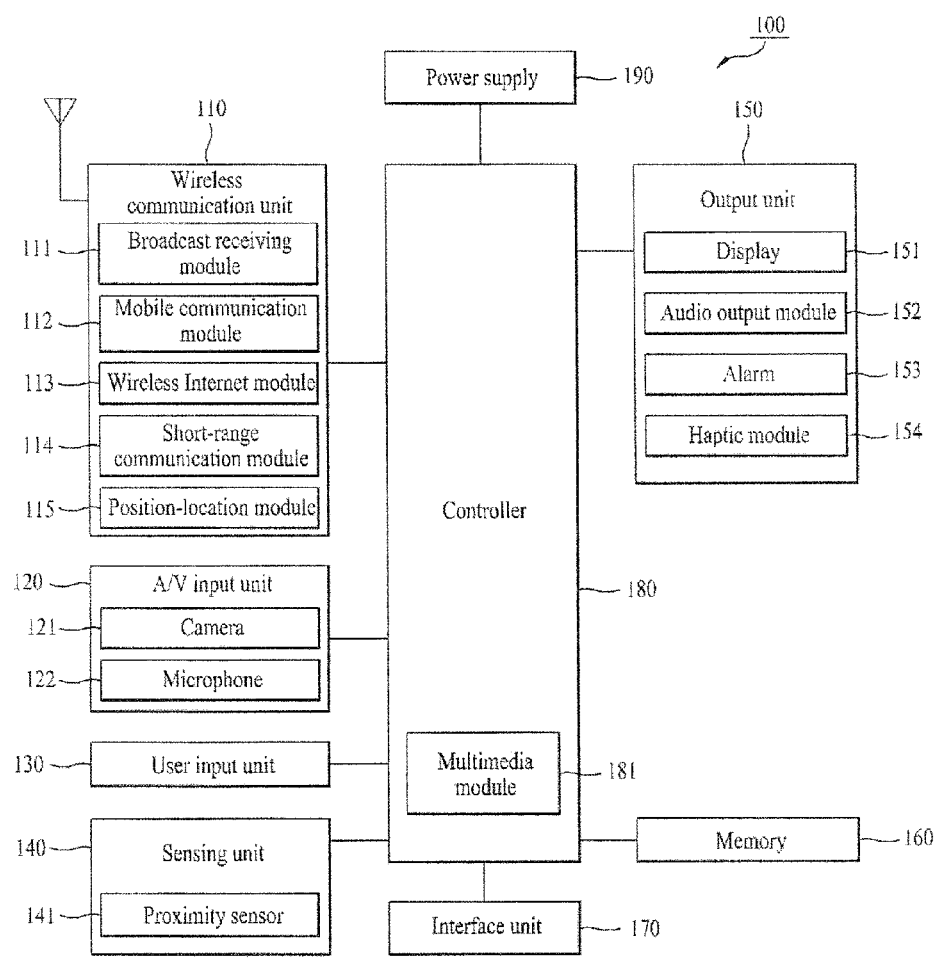
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. More or fewer components may be implemented according to various embodiments.

The wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided in the mobile terminal 100 to facilitate simultaneous reception of at least two broadcast channels or broadcast channel switching.

The broadcast managing server is generally a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and/or a data broadcast signal, among other signals. If desired, the broadcast signal may further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and an electronic service guide (ESG) of digital video broadcast-handheld (DVB-H).

The broadcast receiving module 111 may be configured to receive broadcast signals transmitted from various types of broadcast systems. By nonlimiting example, such broadcasting systems may include digital multimedia broadcasting-terrestrial (DMB-T), digital multimedia broadcasting-satellite (DMB-S), digital video broadcast-handheld (DVB-H), digital video broadcast-convergence of broadcasting and mobile services (DVB-CBMS), Open Mobile Alliance Broadcast (OMA-BCAST), the data broadcasting system known as media forward link only (MediaFLO™) and integrated services digital broadcast-terrestrial (ISDB-T). Optionally, the broadcast receiving module 111 can be configured to be suitable for other broadcasting systems as well as the above-noted digital broadcasting systems.

The broadcast signal and/or broadcast associated information received by the broadcast receiving module 111 may be stored in a suitable device, such as the memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA(High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include NFC (Near Field Communication), radio frequency identification (RFID), infrared data association (IrDA), ultra-wideband (UWB), as well as the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect at least one of an ambient light around the mobile terminal 100, an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, and a haptic module 154 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

When the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, the proximity sensor 141 can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

For clarity and convenience of explanation, an action for enabling the pointer approaching the touchscreen to be recognized as placed on the touchscreen may be named 'proximity touch' and an action of enabling the pointer to actually come into contact with the touchscreen may named 'contact touch'. And, a position, at which the proximity touch is made to the touchscreen using the pointer, may mean a position of the pointer vertically corresponding to the touchscreen when the pointer makes the proximity touch.

The proximity sensor 141 detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include a Near Field Communication (NFC) Chip, User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

It is not mandatory for the identity module to be detachably attached to the mobile terminal via the interface unit 170. Alternatively, the identity module may be permanently built as a sort of the memory unit 160 in the mobile terminal 100.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
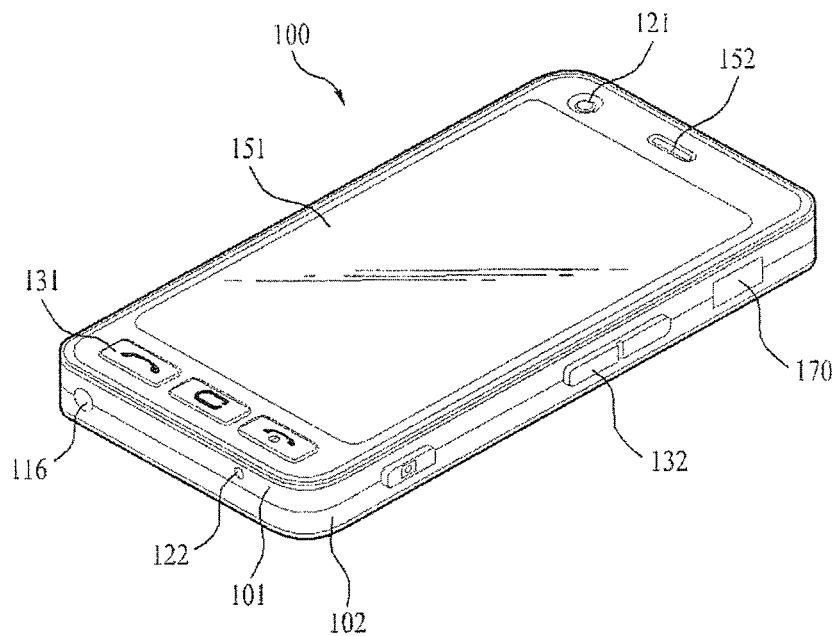
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

The display 151, audio output unit 152, camera 121, user input units 130/131 and 132, microphone 122, interface 170 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 131. And, a command for a volume adjustment of sound output from the audio output unit 152, a command for a switching to a touch recognizing mode of the display 151 or the like can be input to the second manipulating unit 132.

Figure 2B:
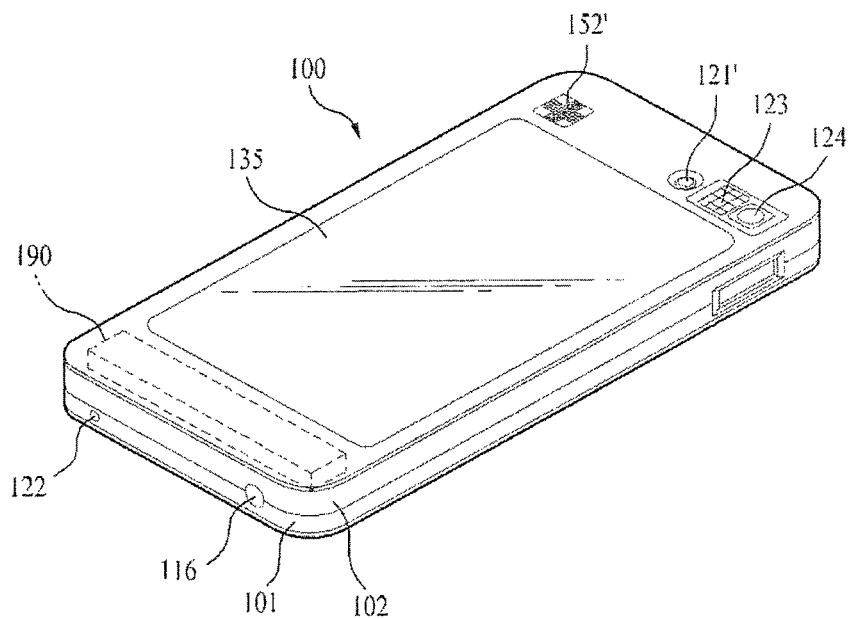
FIG. 2B is a rear perspective diagram of a mobile terminal according to one embodiment of the present invention.

FIG. 2B is a perspective diagram of a backside of the terminal shown in FIG. 2A. Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 116 can be additionally provided to the lateral side of the terminal body as well as an antenna for communication or the like. The antenna 124 constructing a portion of the broadcast receiving module 111 shown in FIG. 1 can be retractably provided to the terminal body.

The power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display 151. In this case, if the display 151 is configured to output visual information from both of its faces, the visual information is viewable via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display 151 of the front case 101. The touchpad 135 can be provided in rear of the display 151 in parallel. The touchpad 135 can have a size equal to or smaller than that of the display 151.

In the disclosure presented herein, embodiments related to a method, which can be implemented in the mobile terminal 100, for controlling the mobile terminal are described with reference to the accompanying drawings.

If the display module 151 includes a touchscreen, implementation of the following embodiments may be further facilitated. Therefore, the following description is made on the assumption that the display module 151 includes a touchscreen. And, a reference number 400 shall refer to a display screen of the touchscreen 151 in the following description.

Moreover, the following embodiments may be applicable to a mobile terminal adopting Android series OS (operating system). Yet, the following embodiments are non-limited by the mobile terminal adopting Android series OS. And, it is apparent to those skilled in the art that the following embodiments may be applicable to mobile terminals adopting operating systems other than Android series OS.

Figure 3:
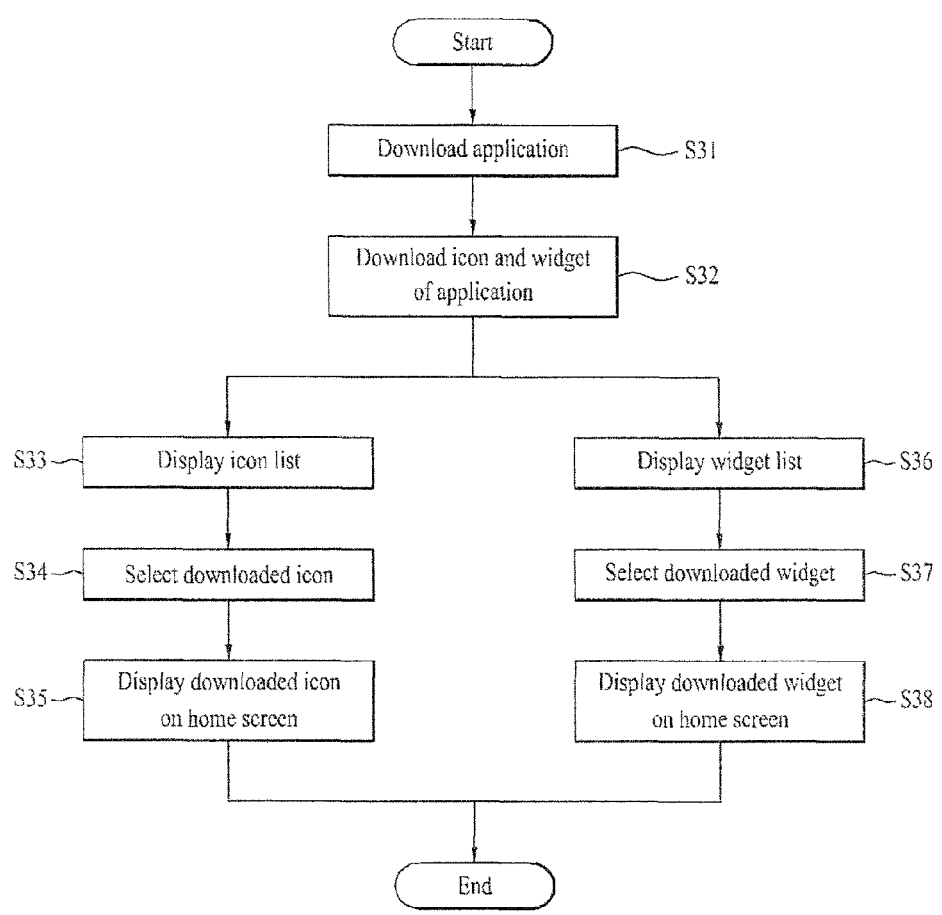
FIG. 3 is a flowchart illustrating a method of controlling a mobile terminal according to one embodiment of the present invention.
Figure 4:
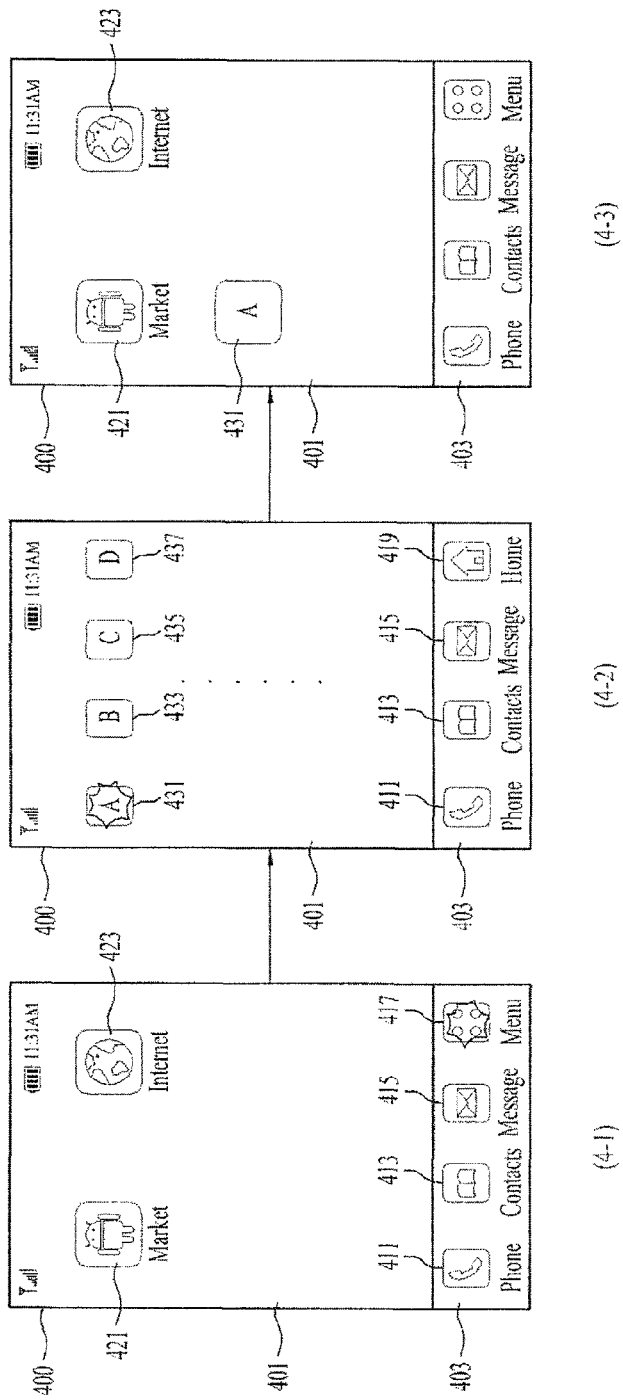
FIGS. 4 to 6 are diagrams of display screen configurations to implement a method of controlling a mobile terminal according to one embodiment of the present invention.
Figure 5:
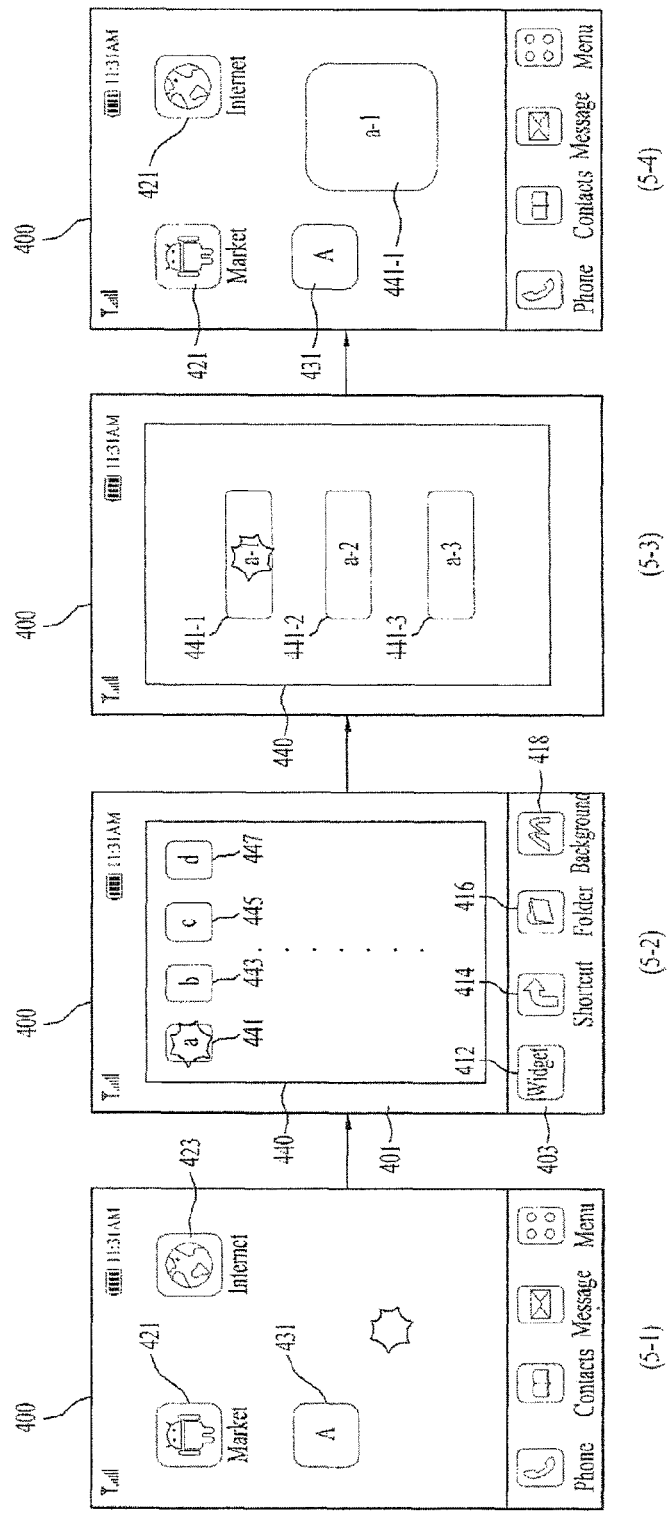
Figure 6:
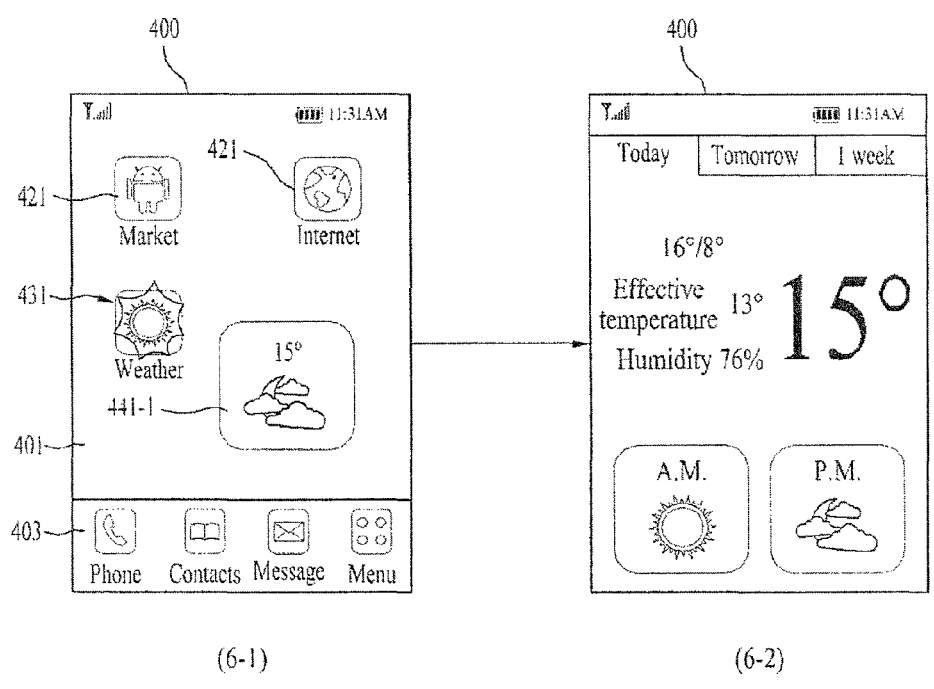

Next, FIG. 3 is a flowchart illustrating a method of controlling a mobile terminal according to one embodiment of the present invention. FIGS. 4 to 6 are diagrams of display screen configurations to implement a method of controlling a mobile terminal according to one embodiment of the present invention.

Referring to FIGS. 3 to 6, the controller 180 of the mobile terminal 100 controls the wireless communication unit 110 to download a desired application to the memory 160 in accordance with a user command by accessing an external device in accordance with a user command (S31).

In doing so, the user command for accessing the external device is input, as shown in FIG. 4(4-1), in which an external server access icon 421 displayed on a home screen of a $1^{st}$ region 401 of the touchscreen 400, for example. An internet access icon 423 can also be displayed.

When the desired application is downloaded, an application icon (hereinafter named an app application or an icon) for activating the desired application and an application widget (hereinafter named a widget) for enabling some limited functions of the desired application to be ordinarily active on the home screen may be downloaded and saved in the memory 160 together with the desired application. In this instance, each of the icon and the widget may be commonly called an object.

After the desired application has been completely downloaded, the controller may not control the downloaded app icon and/or widget to be automatically displayed on the touchscreen 400.

The above-described user's manipulation of the mobile terminal 100 to download the desired application by accessing the external server and then searching for the desired application may be apparent to those skilled in the art and its details shall be omitted for clarity of the following description.

The home screen is further described as follows.

First of all, when the touchscreen is unlocked (or released from a locked state where the touchscreen limitedly recognizes touch action(s) thereon or cannot recognize any touch action thereon), the home screen may be defined as a screen initially displayed on the screen. The touchscreen may be turned on or off in the locked state. In this case, at least one icon or widget may be displayed on the home screen to activate an application or an internal function. At least two home screens may exist in the mobile terminal. In doing so, when a prescribed touch gesture is performed on the touchscreen, the at least two home screens may be sequentially displayed on the It region 401 of the touchscreen 400 one by one. In addition, different icons or widgets may be arranged on the at least two home screens, respectively.

An icon tray for gathering and arranging at least one or more frequently-used icons thereon may be displayed on a $2^{nd}$ region of the touchscreen 400 together with the home screen. Referring to FIG. 4(4-1), a phone (call) icon 411, a contacts icon 413, a message icon 415 and a menu icon 417 are arranged on the icon tray 403 for example.

In the following description, a process for newly displaying an app icon downloaded and saved in the memory 160 on the home screen is explained.

First of all, a user command for displaying at least one or more icons saved in the memory 160 on the touchscreen 400 may be input. For instance, referring to FIG. 4 (4-1), the user command may include an action of touching or tapping the menu icon 417 arranged on the icon tray 403.

If the user command is input, referring to FIG. 4(4-2), the controller 180 displays one or more icons 431, 433, 435 and 437, which are saved in the memory 160, on the $1^{st}$ region of the touchscreen 400 (S33). In this instance, the displayed icons may be saved in advance by a manufacturer of the mobile terminal 100 or may be downloaded by a user from the accessed external server. Assume that an icon 'A' 431 among the displayed icons is the downloaded icon.

The downloaded icon, i.e., the icon 'A' 431 may be touched and selected from the displayed icons (S34). If so, referring to FIG. 4(4-3), the controller 180 controls the icon 'A' 431 to be newly created and displayed on the home screen (S35).

When the at least one or more icons 431, 433, 435 and 437 saved in the memory 160 are displayed on the $1^{st}$ region of the touchscreen 400, the icon saved in advance by the manufacturer of the mobile terminal may be selected and then displayed on the home screen by being newly created thereon.

In the following description, the process for newly displaying the widget downloaded to the memory 160 on the home screen is explained. First of all, a user command for displaying at least one widgets saved in the memory 160 on the touchscreen 400 may be input. In this instance, referring to FIG. 5(5-1), the user command may be executed in which an empty space of the home screen is long touched, for example. This input is not limited to the long touch.

If so, the controller 180 displays a list 440 of the at last one or more widgets 441, 443, 445 and 447 saved in the memory 160 on the touchscreen 400 (S36). The displayed widgets may be saved in advance by a manufacturer of the mobile terminal 100 or may be downloaded by a user from the accessed external server. The saved widgets 441, 443, 445 and 447 are assumed as corresponding to the saved app icons 431, 433, 435 and 447, respectively. For instance, the widget 'a' 441 and the icon 'A' 431 are related to the same application in common.

Yet, it may be unnecessary for all the saved app icons to correspond to the saved widgets, respectively. In particular, when a prescribed application is downloaded, an app icon corresponding to the downloaded application may be downloaded only without a corresponding widget.

Assume that the widget 'a' 441 among the displayed widgets is the widget downloaded in association with the desired application. The downloaded widget, the widget 'a' 441 may be touched and selected from the displayed widgets (S37). When the widget 'a' 441 includes a single widget only, the controller 180 displays the widget 'a' 441 on the home screen (S38).

On the other hand, when the widget 'a' 441 includes (or relates to) at least two or more widgets, referring to FIG. 5(5-3), the controller 180 displays the at least two or more widgets 441-1, 441-2 and 441-3 related to the widget 'a' 441 on the touchscreen 400. The at least two or more widgets all relate to the widget 'a' 441, but one of them may different from the others, for example, in terms of at least one of its size (when displayed on the touchscreen) and its available function(s) related to the application to which the widget 'a' 441 corresponds.

If one widget (e.g., a widget 'a-1') is touched and selected from the at least two or more widgets, referring to FIG. 5(5-4), the controller 180 displays the widget 'a-1' 441-1 to be newly created and displayed on the home screen (S38). FIG. 5(5-4) shows one example that the icon 'A' downloaded in association with the desired application and the icon 'a-1' both are simultaneously displayed.

When the at least one or more widgets 441, 443, 445 and 447 saved in the memory 160 are displayed on the $1^{st}$ region of the touchscreen 400, the widget saved by the manufacturer of the mobile terminal 100 can be selected, created and displayed newly on the home screen.

According to the above description, after the icon 'A' has been newly displayed on the home screen, the widget 'a' is newly displayed, by which the present embodiment is non-limited. Optionally, after the widget 'a' has been newly displayed on the home screen, the icon 'A' can be newly displayed as well.

Assuming that the downloaded desired application is a weather application, referring to FIG. 6(6-1), the downloaded icon 'A' 431 (i.e., a weather app icon) and the widget 'a-1' 441-1 (i.e., a weather widget) are displayed on the home screen for example.

Hence, a terminal user may acquire schematic or pictorial weather information from the weather widget 441-1.

When the terminal user attempts to check a detailed weather information, the terminal user can touch or tap the weather app icon 431. If so, referring to FIG. 6(6-2), the controller 180 activates the weather application and then displays the detailed weather information on the touchscreen 400.

According to the above description, after the icon 'A' has been newly displayed on the home screen, in order for the widget 'a' associated with the icon 'A' to be newly displayed on the home screen, the list 440 of the widgets 441, 443, 445 and 447 (FIG. 5) saved in the memory 160 is displayed and the widget 'a' is then selected from the list 440. In the following description, if the icon 'A' is displayed on the home screen, a method for facilitating the widget 'a' to be displayed on the home screen using the displayed icon 'A' is explained.

Figure 7:
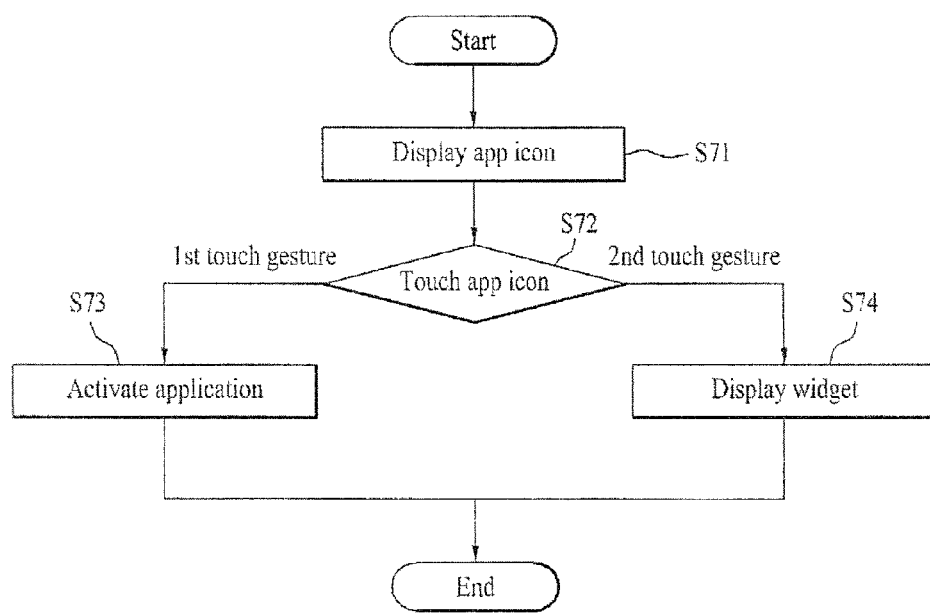
FIG. 7 is a flowchart illustrating a method of controlling a mobile terminal according to another embodiment of the present invention.
Figure 8:
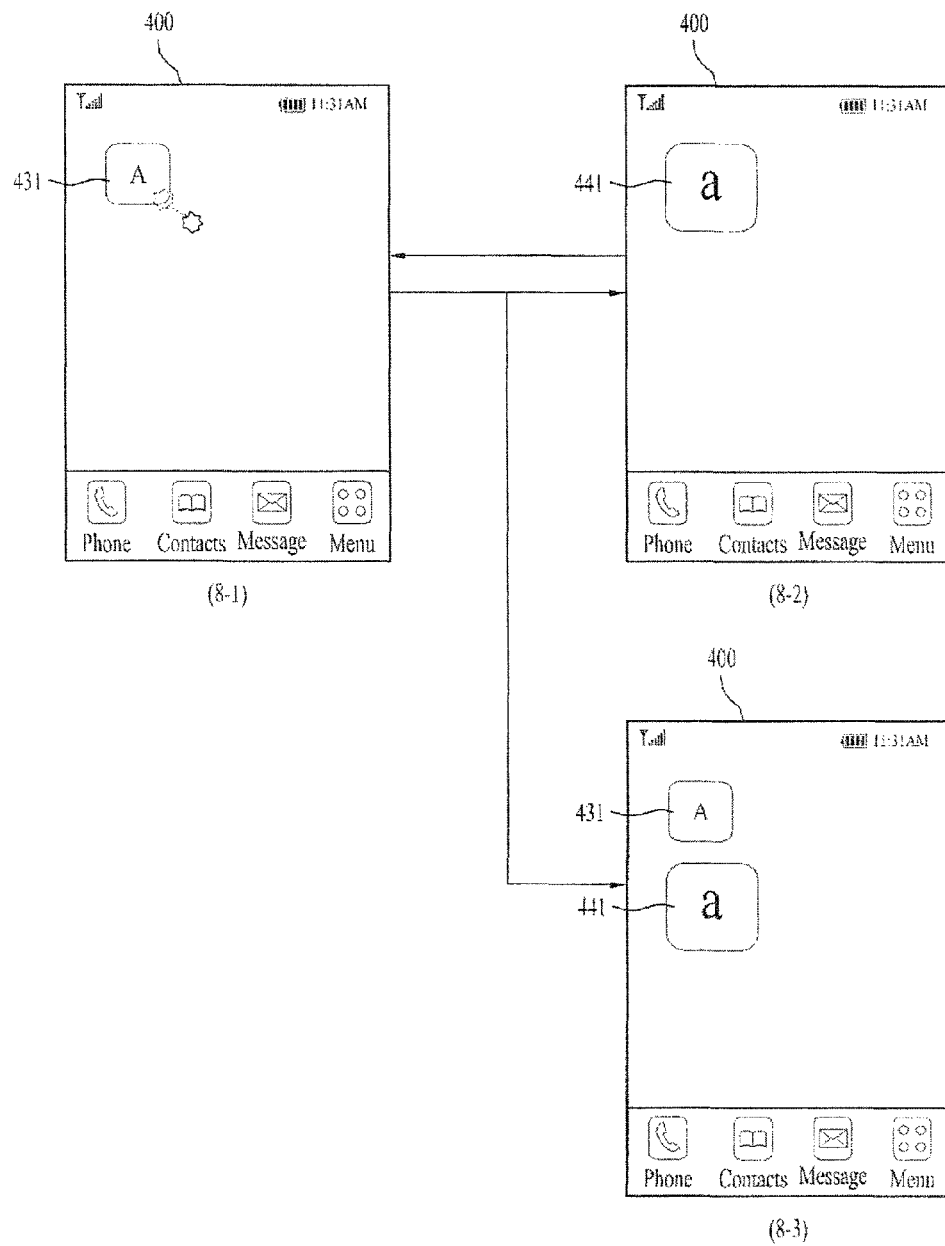
FIGS. 8 to 12 are diagrams of display screen configurations to implement a method of controlling a mobile terminal according to another embodiment of the present invention.

FIG. 7 is a flowchart illustrating a method of controlling a mobile terminal according to the other embodiment of the present invention, and FIG. 8 is a diagram of display screen configurations to implement a method of controlling a mobile terminal according to another embodiment of the present invention.

Referring to FIG. 8(8-1), the app icon 431 of the desired application is displayed on the home screen of the touchscreen 400 (S71). The process for newly creating the app icon 431 on the home screen is already explained in the foregoing description, and its details are omitted from the following description.

If a $1^{st}$ touch gesture is performed on the app icon 431, as mentioned in the foregoing description with reference to FIG. 6(6-2), the controller 180 activates the desired application (S72, S73 in FIG. 7). In this instance, the $1^{st}$ touch gesture may include one of a simple touch (i.e., a single touch to an icon, which is discriminated from 'double touch' or 'long touch' mentioned in the following description), a tapping and the like, by which the present embodiment is non-limited (cf. S62, S63).

Alternatively, if a $2^{nd}$ touch gesture is performed on the app icon 431, the controller 180 creates and displays the widget 441 of the desired application on the touchscreen 400 (S72, S74). In FIG. 8, a single widget 441 corresponds to the desired application.

For instance, the $2^{nd}$ touch gesture may include a touch & drag that is performed by touching one corner of the app icon 431 with such a pointer as a finger, a stylus pen and the like and then dragging the pointer in direction away from a center of the app icon 431 while maintaining the touch, by which the present embodiment is non-limited. This is because a size of the widget 441 is generally greater than that of the app icon 431. If a size of the widget 441 is smaller than that of the app icon 431, the $2^{nd}$ touch gesture may be performed in a manner of touching & dragging one corner of the app icon 431 in direction toward the center of the app icon 431. In another instance, the $2^{nd}$ touch gesture may be performed by double touching (or double tapping) the app icon 431. Further, the one corner may include any one of 4 corners of the app icon 431. Alternatively, the one corner may include a preset one of the 4 corners of the app icon 431.

Meanwhile, a user may perform a $2^{nd}$ touch gesture on a specific app icon having no corresponding widget by mistake. In this instance, in response to the $2^{nd}$ touch gesture, the controller 180 can output an alarm to indicate that there is no widget corresponding to the specific app icon.

Alternatively, even if the widget corresponds to the specific app icon, the user may perform a touch gesture of a different pattern or trajectory, which is different from a preset $2^{nd}$ touch gesture, on the specific app icon by mistake. In this instance, the controller 180 can output an alarm indicating that an error occurs in recognizing the touch gesture of the different pattern or trajectory.

For instance, the alarm may be provided to the user changing one or more of a shape and a color of the specific app icon having the touch gesture applied thereto a predetermined duration.

Regarding the newly displayed widget 441, in response to the $2^{nd}$ touch gesture, referring to FIG. 8(8-2), the controller 180 displays the widget 441 based on the $2^{nd}$ touch gesture applied app icon 431 and no longer displays the app icon 431 from the home screen. In doing so, the app icon 431 and the widget 441 can be usable alternately and usefully without being simultaneously displayed on the home screen, thereby enhancing space utilization of the home screen.

If a $3^{rd}$ touch gesture is performed on the widget 441, the controller 180 can return the widget 441 to the app icon 431. In doing so, if the $2^{nd}$ touch gesture is the aforementioned touch & drag performed in one direction, the $3^{rd}$ touch gesture may include a touch gesture performed in the widget in direction opposite to the one direction. A corner of the app icon 431, from which the $3^{rd}$ touch gesture starts, can also be matched to or may be different from the corner of the app icon 431, from which the $2^{nd}$ touch gesture starts. Considering that each of the $2^{nd}$ touch gesture and the $3^{rd}$ touch gesture is performed by a touch & drag action despite that the $2^{nd}$ touch gesture and the $3^{rd}$ touch gesture differ from each other in drag direction, each of the $2^{nd}$ touch gesture and the $3^{rd}$ touch gesture may be understood as belonging to a touch gesture of the same kind.

When the $2^{nd}$ touch gesture is a double touch, the $3^{rd}$ touch gesture may include a double touch performed on the widget 441 one more time. In this instance, the $3^{rd}$ touch gesture is identical to the $2^{nd}$ touch gesture.

Alternatively, in response to the $2^{nd}$ touch gesture, referring to FIG. 8(8-3), the controller 180 can create and display the widget 441 on the home screen around the app icon 431. In doing so, since both of the app icon 431 and the widget 441 are simultaneously displayed, a user can conveniently select one of the app icon 431 and the widget 441.

If a $4^{th}$ touch gesture is performed on the widget 441, the controller 180 stops displaying the widget 441 from the home screen. For instance, the $4^{th}$ touch gesture may be performed by creating a trashcan icon in accordance with a long touch applied to the widget 441 and then dragging the widget 441 to the trashcan icon.

In order to activate the desired application, it is not mandatory for the $1^{st}$ touch gesture to be performed on the app icon 431 only. For instance, the controller 180 can activate the desired application if the $1^{st}$ touch gesture is performed on the widget 441 as well.

According to the above description with reference to FIG. 8, while the app icon is already displayed on the home screen, and if a specific touch gesture is performed on the displayed app icon, the widget icon is newly displayed instead of or together with the app icon, by which the present embodiment is non-limited. Alternatively, while the widget icon is already displayed on the home screen, and if a specific touch gesture is performed on the displayed widget icon, the app icon may be newly displayed instead of or together with the widget icon. The specific touch gesture may include one of the aforementioned $2^{nd}$ and $3^{rd}$ touch gestures, by which the specific touch gesture is non-limited. Also, this specific touch gesture may applicable to the following description in the same manner.

For clarity of the following description of touch gestures, a simple touch or tap performed on an icon or a widget is called a simple touch gesture, a touch gesture attributed to a touch & drag in direction moving away from a center of an app icon or widget is called an outward direction drag touch gesture, a touch gesture attributed to a touch & drag in direction moving closer to a center of an app icon or widget is called an inward direction drag touch gesture, a touch gesture attributed to a double/triple touch is called a double/triple touch gesture, and a touch gesture attributed to a long touch is called a long touch gesture.

According to the above description with reference to FIG. 8, explained is a situation that only the single widget 441 corresponds to the desired application. In the following description, FIG. 9 illustrates a situation that at least two or more widgets correspond to the desired application.

Figure 9:
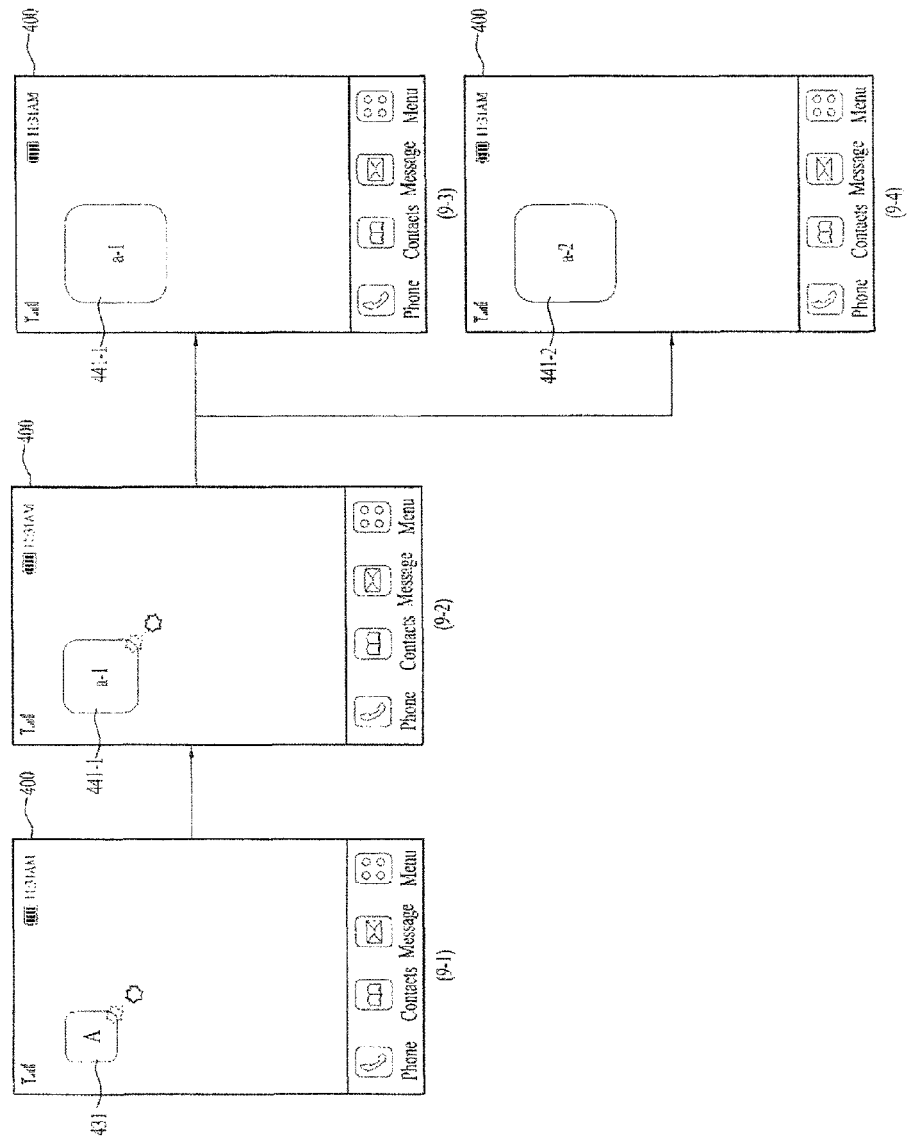

In more detail, FIG. 9 is a diagram of display screen configurations to implement a method of controlling a mobile terminal according to another embodiment of the present invention. Referring to FIG. 9(9-1), the app icon 431 of the desired application may be displayed on the home screen of the touchscreen 400.

The aforementioned double touch gesture or the aforementioned outward direction drag touch gesture may be performed on the app icon 431. If so, in response to the double touch gesture or the outward direction drag touch gesture, referring to FIG. 9(9-2), the controller 180 creates and displays a $1^{st}$ widget 441-1 (e.g., a smaller or smallest widget among the at least two or more widgets, etc., by which the $1^{st}$ widget is non-limited) preset among the at least two or more widgets corresponding to the desired application on the home screen of the touchscreen 400 while the app icon 431 is no longer displayed.

Subsequently, the outward direction drag touch gesture may be performed on the $1^{st}$ widget 441-1 shown in FIG. 9(9-2). If so, in response to the outward direction drag touch gesture, referring to FIG. 9(9-3), the controller 180 increases a size of the $1^{st}$ widget 441-1 in proportion to a length of the outward direction drag. Moreover, if the inward direction drag touch gesture is performed on the increasing $1^{st}$ widget 441-1, the controller 180 can decrease control the size of the $1^{st}$ widget 441-1 in proportion to a length of the inward direction drag.

Alternatively, in response to the outward direction drag touch gesture, referring to FIG. 9(9-4), the controller 180 displays a $2^{nd}$ widget 441-2 (e.g., a $2^{nd}$ smallest widget among the at least two or more widgets, by which the $2^{nd}$ widget is non-limited) preset among the at least two or more widgets while stopping the display of the $1^{st}$ widget 441-1. In particular, the $1^{st}$ widget may be changed into the $2^{nd}$ widget. Moreover, if the inward direction drag touch gesture is performed on the $2^{nd}$ widget 441-2, the controller 180 can restore the $2^{nd}$ widget 441-2 into the $1^{st}$ widget.

Meanwhile, the double gesture may be formed on the $1^{st}$ widget 441-1 shown in FIG. 9(9-2) or FIG. 9(9-3). If so, in response to the double touch gesture, referring to FIG. 9(9-4), the $1^{st}$ widget 441-1 is changed into the $2^{nd}$ widget 441-2.

Subsequently, the double touch gesture may be performed on the $2^{nd}$ widget 441-2. If there is a $3^{rd}$ widget corresponding to the desired application, the controller 180 may change the $2^{nd}$ widget into the $3^{rd}$ widget. If the $3^{rd}$ widget corresponding to the desired application does not exist, the controller 180 can change the $2^{nd}$ widget into the application icon.

The triple touch gesture may be performed on the $1^{st}$ widget 441-1 shown in FIG. 9(9-2) or FIG. 9(9-3) or the $2^{nd}$ widget 441-2 shown in FIG. 9(9-4). If so, in response to the triple touch gesture, the controller 180 can restore the $1^{st}$ widget or the $2^{nd}$ widget into the app icon 431. The widget right before returning to the app icon 431 and a size of the corresponding widget may also be saved in the memory 160.

Hence, when the $2^{nd}$ touch gesture is performed on the restored app icon, the controller 180 can change the app icon into the widget of which size is the size of the widget right before returning to the app icon.

Figure 10:
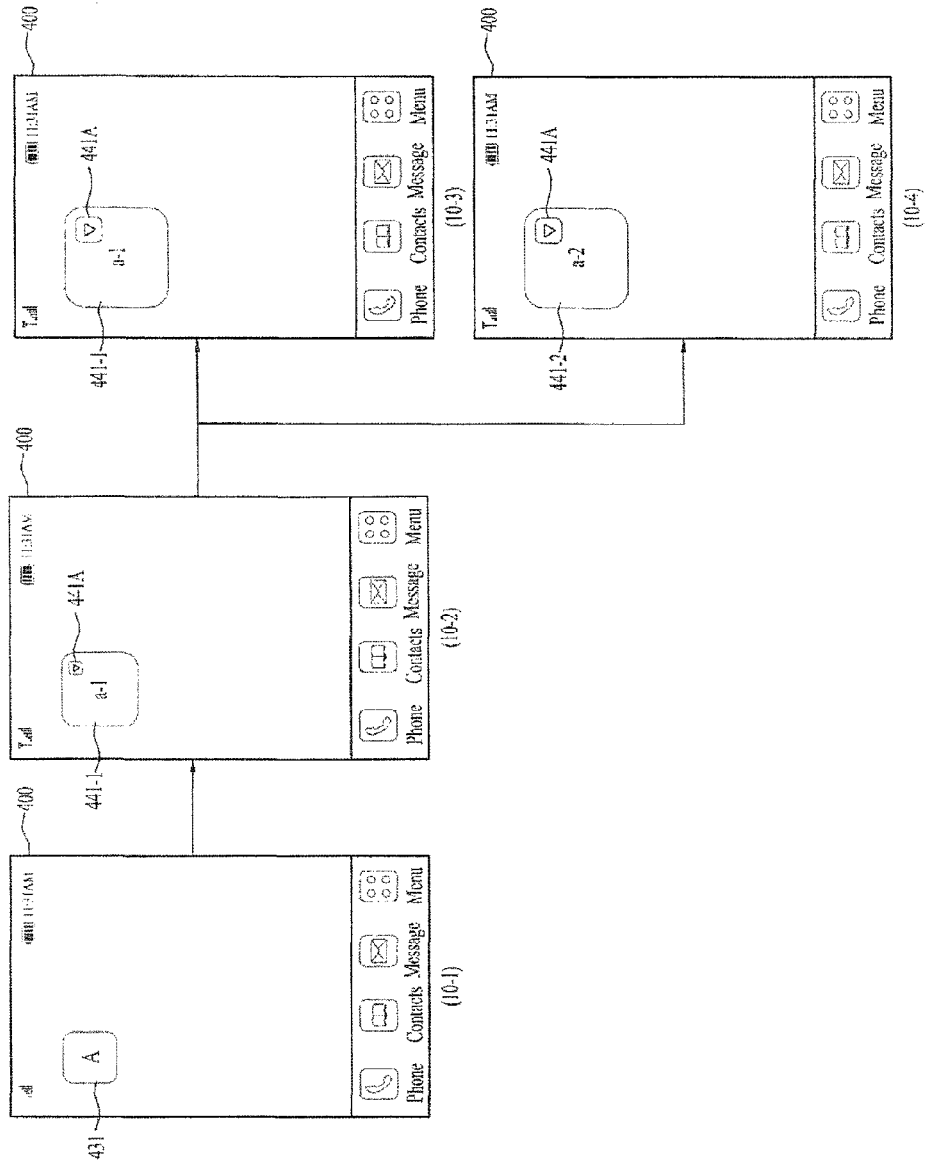

In the following description, explained with reference to FIG. 10 is a situation that at least two or more widgets correspond to the desired application. In more detail, FIG. 10 is a diagram of display screen configurations to implement a method of controlling a mobile terminal according to another embodiment of the present invention.

Referring to FIG. 10(10-1), the app icon 431 of the desired application is displayed on the home screen of the touchscreen 400. The aforementioned double touch gesture may be performed on the app icon 431.

If so, in response to the double touch gesture, referring to FIG. 10(10-2), the controller 180 can change the app icon 431 into a $1^{st}$ widget 441-1 preset among the at least two or more widgets. In addition, an inter-widget change icon 441A may be displayed within the $1^{st}$ widget 441-1.

Subsequently, the outward or inward direction drag touch gesture can be performed on the $1^{st}$ widget 441-1. If so, in response to the outward or inward direction drag touch gesture, referring to FIG. 10(10-3), the controller 180 can adjust a size of the $1^{st}$ widget 441-1. Since the process for adjusting the widget size in accordance with the outward or inward direction drag touch gesture is already described in the foregoing description, its details are omitted from the following description.

Subsequently, a simple touch can be performed on the inter-widget change icon 441A of the $1^{st}$ widget 441-1 shown in FIG. 10(10-1) or FIG. 10(10-2). If so, in response to the simple touch performed on the inter-widget change icon 441A, referring to FIG. 10(10-4), the controller 180 changes the $1^{st}$ widget 441-1 into a $2^{nd}$ widget 441-2. As shown, the inter-widget change icon 441A may be displayed on the $2^{nd}$ widget 441-2.

If the outward or inward direction drag touch gesture is performed on the $2^{nd}$ widget 441-2 shown in FIG. 10(10-4), the controller 180 can adjust a size of the $2^{nd}$ widget 441-2. Meanwhile, a simple touch may be performed on the inter-widget change icon 441A shown in FIG. 10(10-4). If there is a $3^{rd}$ widget corresponding to the desired application, the controller 180 can change the $2^{nd}$ widget into the $3^{rd}$ widget. If the $3^{rd}$ widget corresponding to the desired application does not exist, the controller 180 can change the $2^{nd}$ widget into the $1^{st}$ widget.

The double touch gesture may also be performed on the $1^{st}$ widget 441-1 shown in FIG. 10(10-2) or FIG. 10(10-3) or the $2^{nd}$ widget 441-2 shown in FIG. 10(10-4). If so, in response to the double touch gesture, the controller 180 can restore the $1^{st}$ widget or the $2^{nd}$ widget into the app icon 431. In doing so, the widget right before returning to the app icon 431 and a size of the corresponding widget can be saved in the memory 160.

Hence, when the double touch gesture is performed on the restored app icon, the controller 180 can change the app icon into the widget of which size is the size of the widget right before returning to the app icon.

Figure 11:
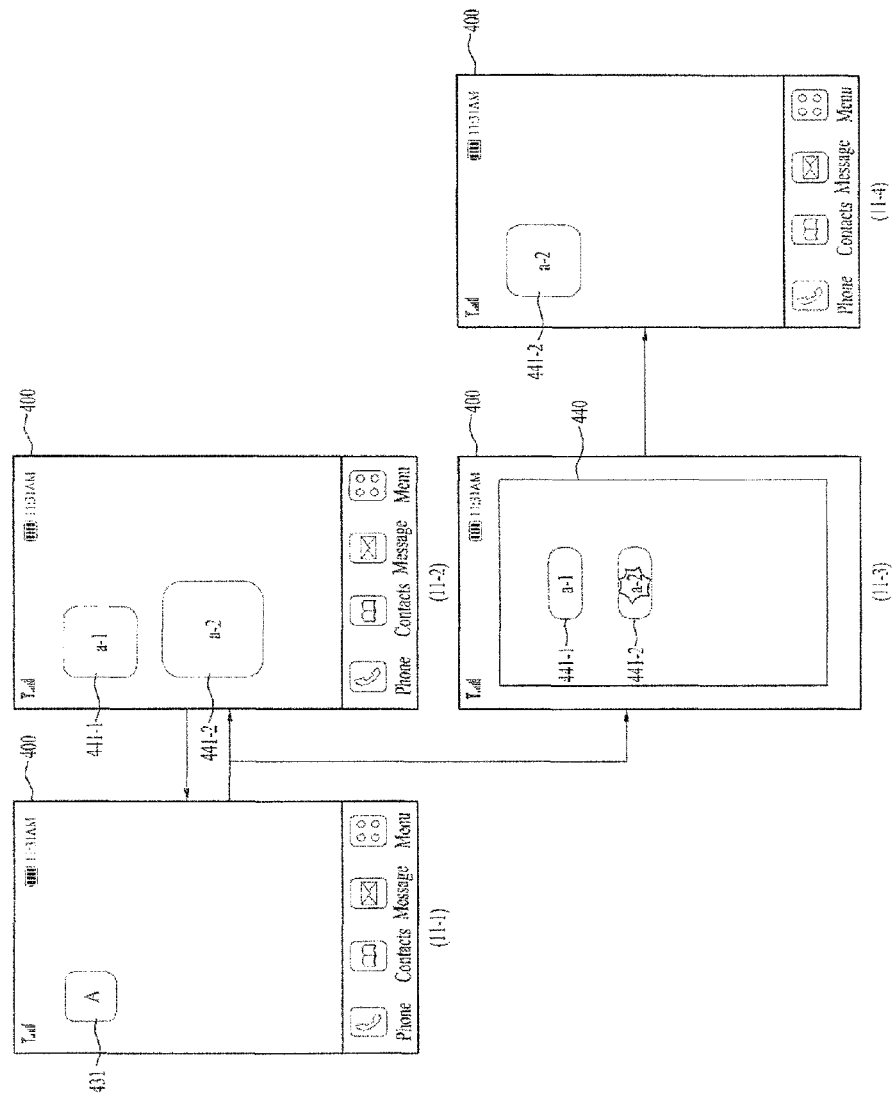

In the following description, explained with reference to FIG. 11 is a situation that at least two or more widgets correspond to the desired application. In particular, FIG. 11 is a diagram of display screen configurations to implement a method of controlling a mobile terminal according to another embodiment of the present invention.

Referring to FIG. 11(11-1), the app icon 431 of the desired application is displayed on the home screen of the touchscreen 400. The $2^{nd}$ touch gesture can then be performed on the app icon 431.

If so, in response to the $2^{nd}$ touch gesture performed on the app icon 431, referring to FIG. 11(11-2), the controller 180 can change the app icon 431 into a $1^{st}$ widget 441-1 preset among the at least two or more widgets and also create and display the rest of the widget(s) together with the $1^{st}$ widget 441-1. In FIG. 11, the rest of the widget(s) includes a $2^{nd}$ widget 441-2 only.

Meanwhile, a touch gesture (e.g., the long touch gesture mentioned in the foregoing description) for removing one of the $1^{st}$ widget and the $2^{nd}$ widget from the home screen may be performed. If so, the controller 180 can stop displaying the one widget and may also maintain displaying the other widget. Alternatively, the controller 180 can change the other widget into the app icon when the one widget disappears.

A touch gesture for restoring one of the $1^{st}$ widget and the $2^{nd}$ widget into the app icon may also be performed. If so, the controller 180 restores the one widget into the app icon and also maintains displaying the other widget. Alternatively, the controller 180 can restore the one widget into the app icon and stop displaying the other widget.

Alternatively, in response to the $2^{nd}$ touch gesture performed on the app icon, referring to FIG. 11(11-3), the controller 180 can display a list 440 of the at least two widgets 441-1 and 441-2 related to the desired application on the home screen.

If one widget is touched and selected from the list 440, referring to FIG. 11(11-4), the controller 180 displays the selected widget on the home screen. Since the process for changing the selected widget into another widget or the app icon and the process for changing a size of the selected widget are already mentioned in the foregoing description, their details are omitted from the following description.

According to the above description, when a specific touch gesture is performed on the app icon displayed on the home screen, a widget corresponding to the app icon is displayed on the home screen. However, when at least two or more app icons are displayed on the home screen, all of the at least two app icons may not be matched with corresponding widgets, respectively. This is described in detail with reference to FIG. 12. In particular, FIG. 12 is a diagram of display screen configurations to implement a method of controlling a mobile terminal according to another embodiment of the present invention.

Figure 12:
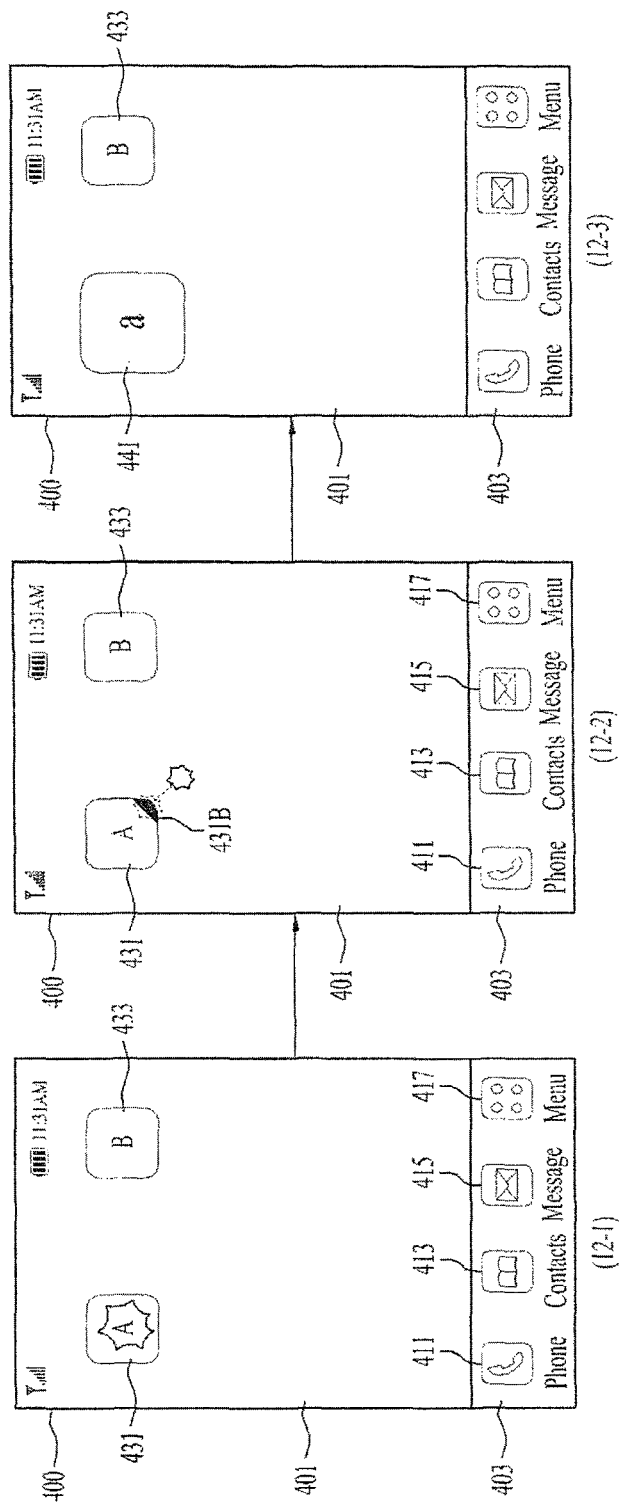

Referring to FIG. 12(12-1), at least two app icons 431 and 433 are displayed on the home screen of the touchscreen 400. A specific touch gesture may also be performed on one icon 431 of the at least two app icons 431 and 433. In this instance, the specific touch gesture may be as a long touch gesture, by which the specific touch gesture is non-limited.

If so, the controller 180 can determine whether a widget corresponding to the long touch gesture applied app icon 431 is saved in the memory 160. As a result of the determination, if the widget corresponding to the long touch gesture applied app icon 431 is saved in the memory 160, referring to FIG. 12(12-2), the controller 180 displays a widget indicator 431B on the app icon 431 to indicate that the widget corresponding to the long touch gesture applied app icon 431 is saved in the memory 160. In particular, the widget indicator 431B may be displayed at one corner of the app icon 431. It may be unnecessary for the widget indicator 431B to be always displayed on the app icon 431. Instead, the widget indicator 431B may be displayable at any position on the home screen.

Thus, a user can observe a presence of the widget corresponding to the app icon 431 from the widget indicator 431B. Thereafter, an outward direction drag touch gesture (or one of the touch gestures mentioned in the foregoing description) may be applied to the corner of the app icon 431 having the widget indicator 431B displayed thereon.

In response to the outward direction drag touch gesture, referring to FIG. 12(12-3), the controller 180 can display the corresponding widget 441 on the home screen. In particular, the widget 441 can be newly displayed in the same manner as explained in the foregoing description. For instance, the app icon 431, to which the outward direction drag touch gesture is applied, may be changed into the corresponding widget 441.

If there is no widget corresponding to the app icon 431 having the long touch gesture applied thereto, the controller 180 can not display the widget indicator on the app icon 431. Hence, a user does not attempt to perform the outward direction drag touch gesture on the app icon 431.

Meanwhile, it is possible not to display the widget indicator 431B on the app icon 431 only when the specific touch gesture is performed. For instance, if the widget corresponding to the app icon 431 exists despite that the specific touch gesture is not performed, the widget indicator 431B may be configured to be displayed on the app icon 431 since the app icon 431 is initially displayed on the home screen. Of course, if the widget corresponding to the app icon 431 does not exit, the widget indicator 431B may be configured not to be displayed on the app icon 431 since the app icon 431 is initially displayed on the home screen.

According to the above description, app icons and their widgets are explained. This concept may also be extended and applied to folder icons. This is described in detail with reference to FIGS. 13 and 14 as follows.

Figure 13:
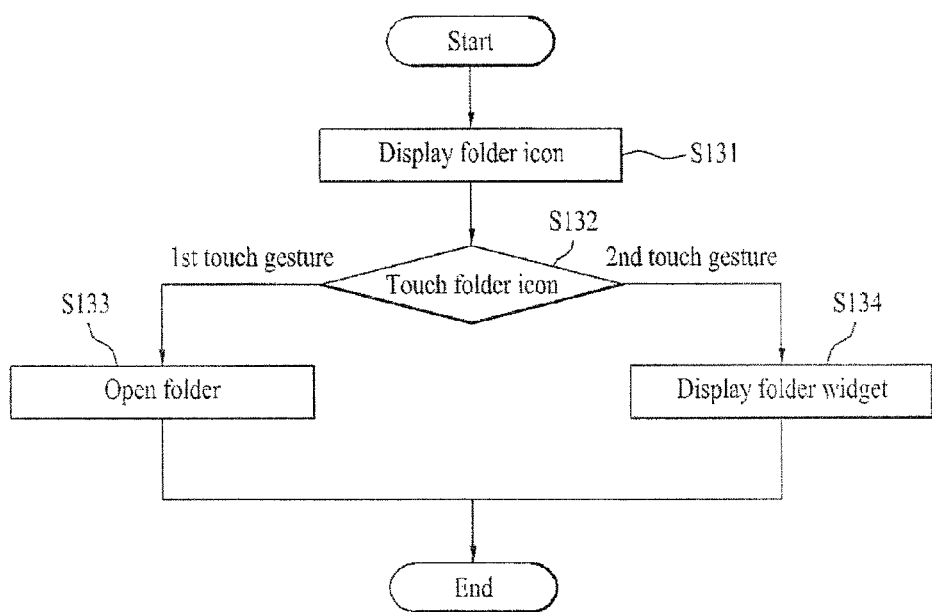
FIG. 13 is a flowchart illustrating a method of controlling a mobile terminal according to a further embodiment of the present invention.
Figure 14:
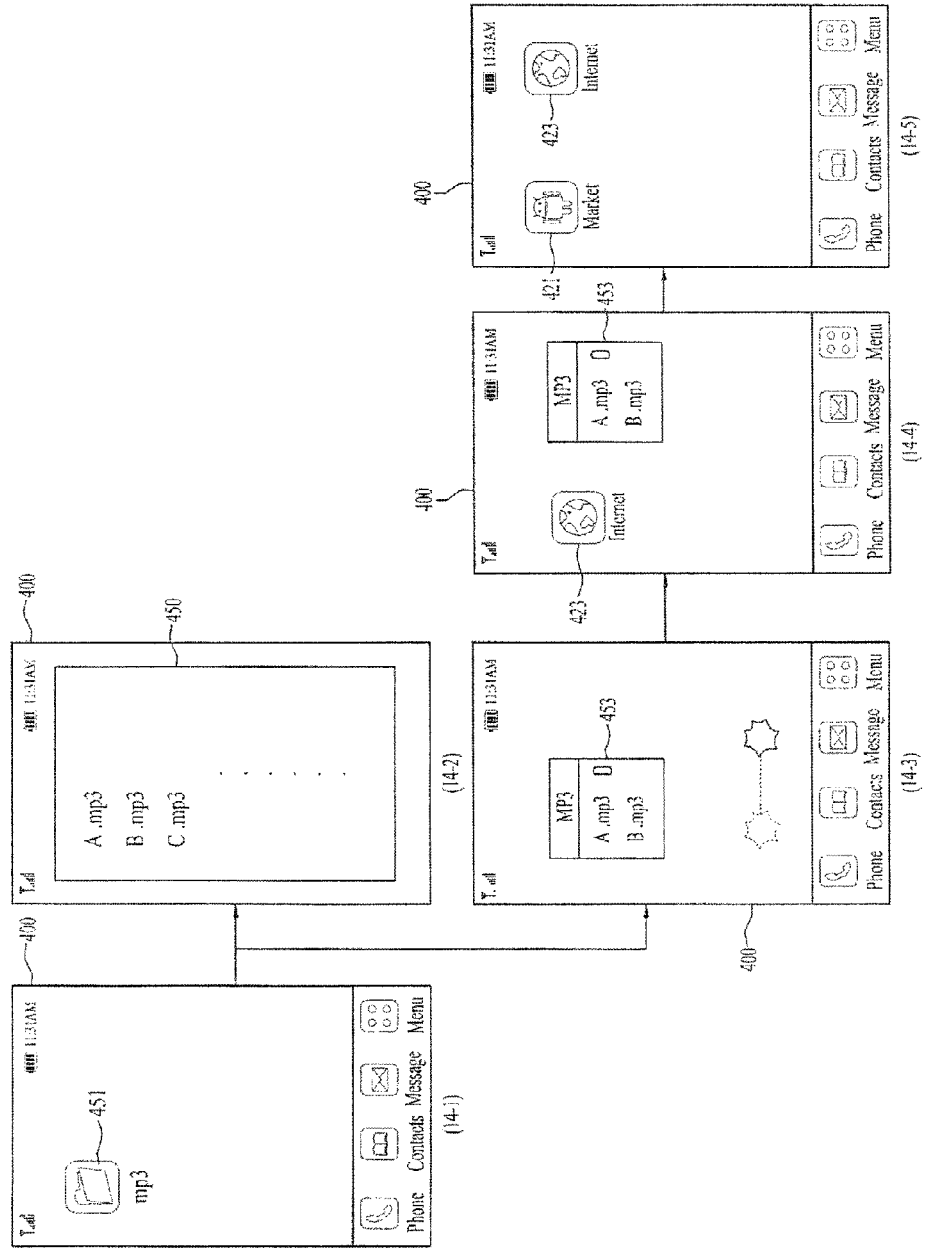

In particular, FIG. 13 is a flowchart illustrating a method of controlling a mobile terminal according to a further embodiment of the present invention, and, FIG. 14 is a diagram of display screen configurations to implement a method of controlling a mobile terminal according to a further embodiment of the present invention.

Referring to FIGS. 13 and 14, a folder icon 451 of a specific folder (e.g., MP3 file folder) is displayed on a $1^{st}$ home screen of the touchscreen 400 (S131) (FIG. 14 (14-1)).

If a $1^{st}$ touch gesture is performed on the folder icon 451, the controller 180 can open the MP3 file folder on the touchscreen 400 and display at least one or more MP3 files in the folder within the opened MP3 file folder 450 on the touchscreen 400 (S132, S133). If the MP3 file folder is open, the controller 180 can not switch the $1^{st}$ home screen to a $2^{nd}$ home screen despite that a home screen switch user command (e.g., a touch drag in horizontal direction on the touchscreen 400) is input. Since the $1^{st}$ touch gesture is already mentioned in the foregoing description, its details are omitted from the following description.

If a user touches and selects one of the displayed MP3 files, the selected MP3 file may be played. Meanwhile, if a $2^{nd}$ touch gesture is performed on the folder icon 451, the controller 180 changes the folder icon 451 into a folder widget 453 (S132, S134). When the specific folder is created, the folder widget 453 may be created within the mobile terminal 100. If the specific folder is provided in advance by a manufacturer of the mobile terminal 100, the folder widget 453 may be saved in advance within the mobile terminal 100 by the manufacturer of the mobile terminal 100. In particular, the folder widget 453 may not be downloaded from the external server.

The MP3 files belonging to the MP3 file folder may also be displayed within a limited space of the folder widget 453. The number of the MP3 files displayable within the folder widget 453 may be smaller than that of the MP3 files displayed when the MP3 file folder is open. Since the $2^{nd}$ touch gesture is already explained in the foregoing description, its details shall are omitted from the following description.

The user can also find a specific MP3 file by scrolling the displayed MP3 files by performing a touch & drag on the folder widget 453 in portrait direction. If the user touches and selects the MP3 file, the selected MP3 file can be played back.

While the folder widget 453 is displayed, referring to FIG. 14(14-2), if the home screen switch user command is input, the controller 180 can switch the $1^{st}$ home screen to the $2^{nd}$ home screen (FIG. 14(14-3), FIG. 14(14-4)).

In the above description, a change between an app icon and a widget corresponding to the app icon is explained. However, if a size of the app icon and a size of the widget changed from the app icon are compared to each other, the size of the widget may be greater than that of the app icon. Hence, when an app icon is changed into a corresponding widget, the changed widget may affect other objects around the corresponding app icon due to its size. This is described in detail with reference to FIGS. 15 to 18.

Figure 15:
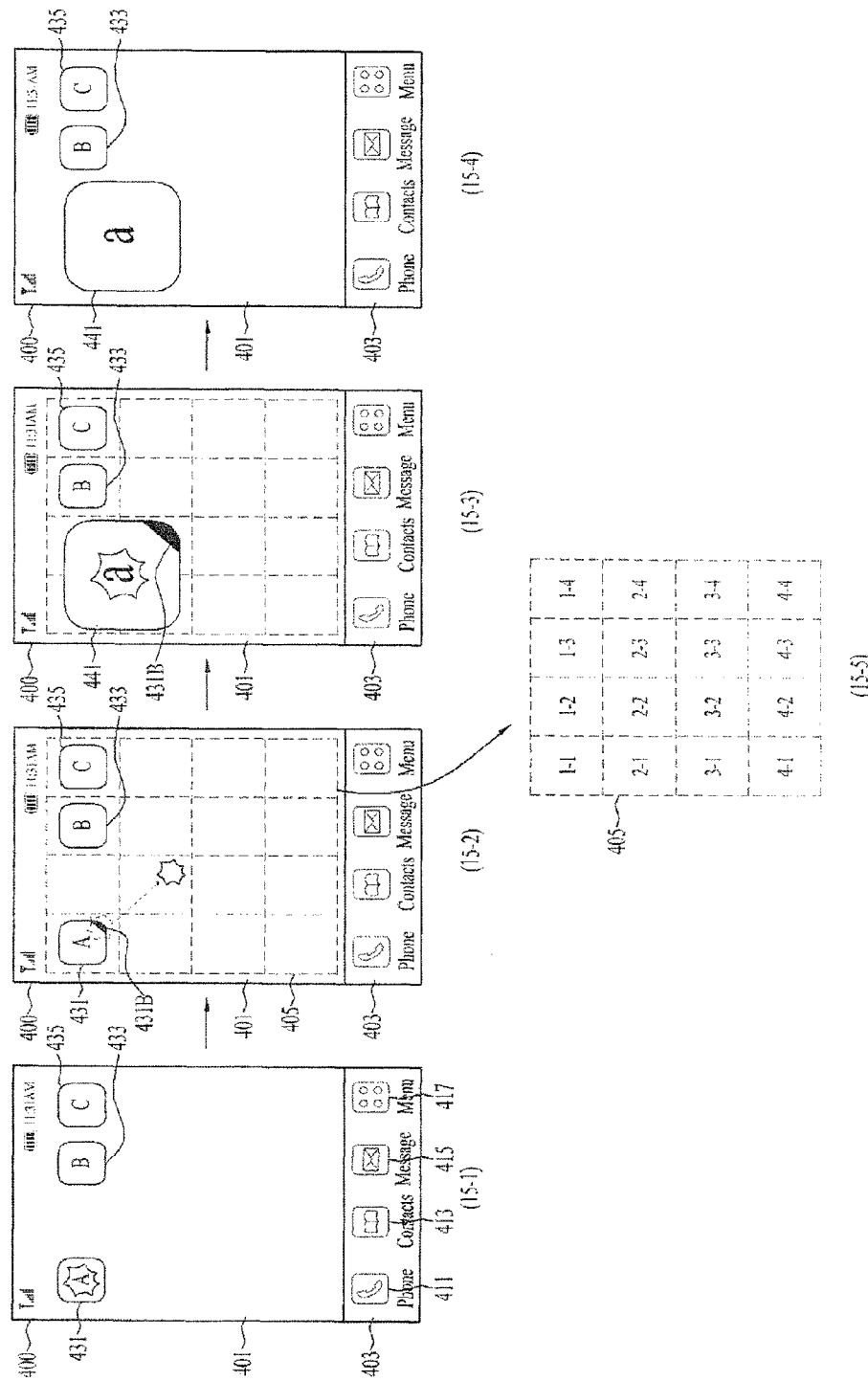

FIGS. 15 to 18 are diagrams of display screen configurations to implement a method of controlling a mobile terminal according to a further embodiment of the present invention. Referring to FIG. 15(15-1), a $1^{st}$ app icon 431, a $2^{nd}$ app icon 433 and a $3^{rd}$ app icon 435 are displayed on a $1^{st}$ region 401 of the touchscreen 400.

In doing so, a user command for entering an object change mode for the mobile terminal 100 to activate a change between the aforementioned app icon and a corresponding widget may be input. No limitation is put on the user command. For clarity of the following description, the user command includes a long touch gesture applied to the $1^{st}$ app icon 431. In order for the mobile terminal 100 to enter the object change mode, even if the long touch gesture is applied to another app icon (i.e., the $2^{nd}$ app icon, the $3^{rd}$ app icon, etc.) instead of the $1^{st}$ app icon, the mobile terminal 100 can enter the object change mode.

Referring to FIG. 15(15-2), in response to the long touch gesture, the controller 180 enters the mobile terminal 100 into the object change mode. After the mobile terminal 100 has entered the object change mode, the controller 180 can display an object arrangement grid 405 on the $1^{st}$ region 401 of the touchscreen 400. In this instance, the object arrangement grid 405 is provided to help the user with the arrangement of objects on the $1^{st}$ region 405 of the touchscreen 400. Further, each of the objects may be arranged to occupy at least one cell of the grid 405 in accordance with its size. Optionally, the object arrangement grid 405 may not be displayed during the object change mode. FIG. 15(15-2) shows one example that a size of the object arrangement grid is 4×4. For clarity of the following description, the object arrangement grid 405 includes 16 cells cell 1-1 to cell 4-4 (FIG. 15(15-5)).

Referring to FIG. 15(15-2), the $1^{st}$ app icon 431, the $2^{nd}$ app icon 433 and the $3^{rd}$ app icon 435 are arranged at the cell 1-1, the cell 1-3 and the cell 1-4 in the object arrangement grid 405, respectively. At the timing point of entering the object change mode, the controller 180 can save location information (or cell information) on locations (or cells), at which the $1^{st}$ to $3^{rd}$ app icons are arranged in the object arrangement grid 405, in the memory 160. For example, the controller 180 can store the location information of the $1^{st}$ to $3^{rd}$ app icons until the object change mode is cancelled in the mobile terminal.

As the mobile terminal 100 enters the object change mode, the controller 180 displays a widget indicator 431B on the $1^{st}$ app con 431 to which the long touch gesture is applied. As mentioned in the foregoing description, the widget indicator 431B indicates a presence of the widget corresponding to the $1^{st}$ app icon 431.

Since the long touch gesture is performed on the $1^{st}$ app icon 431, FIG. 15(15-2) shows that the widget indicator 431B is displayed on the $1^{st}$ app icon 431 only, by which the present embodiment is non-limited. Moreover, when the long touch gesture is performed on the $1^{st}$ app icon 431, and if the $2^{nd}$ app icon or the $3^{rd}$ icon has a corresponding widget as well, another widget indicator may be displayed on the $2^{nd}$ or $3^{rd}$ app icon.

Subsequently, a $1^{st}$ outward direction drag touch gesture may be performed on the $1^{st}$ app icon 431. In particular, the $1^{st}$ outward direction drag touch gesture starts from the widget indicator 431B of the $1^{st}$ app icon 431 and extends in an outward direction. In particular, the $1^{st}$ outward direction drag touch gesture may be a touch gesture for increasing a size of the $1^{st}$ app icon 431 (or for widening a boundary of the $1^{st}$ app icon 431 to outside).

If so, referring to FIG. 15(15-3), in response to the $1^{st}$ outward direction drag touch gesture, the controller 180 changes the $1^{st}$ app icon 431 into a $1^{st}$ widget 441. Simultaneously, referring to FIG. 15(15-3), the controller 180 can match the changed $1^{st}$ widget 441 to have a size to an end point of the $1^{st}$ outward direction drag touch gesture. In particular, the controller 180 may display the changed $1^{st}$ widget 441 to have a size that occupies the cell 1-1, the cell 1-2, the cell 2-1 and the cell 2-2 in the object arrangement grid 405. Because no object exists in the cell 1-1, the cell 1-2, the cell 2-1 and the cell 2-2 other than the $1^{st}$ app icon 431 having the $1^{st}$ outward direction drag touch gesture applied thereto, there is little problem in that the changed $1^{st}$ widget 441 has the size occupying the cell 1-1, the cell 1-2, the cell 2-1 and the cell 2-2. Further, the controller 180 can maintain displaying the widget indicator 431B on the changed $1^{st}$ widget 441. Also, the widget indicator 431B may play a role in indicating a presence of the $1^{st}$ app icon 431 corresponding to the $1^{st}$ widget 441. Hence, the widget indicator 431B on the $1^{st}$ widget 441 can be an app icon indicator that indicates a presence of the $1^{st}$ app icon 431 corresponding to the $1^{st}$ widget 441.

In the following description, the widget indicator or the app icon indicator is called an object indicator. Therefore, a user command for releasing the mobile terminal 100 from the object change mode may be input. In this instance, no limitation is put on the user command. For clarity of the following description, the user command may include a long touch gesture applied to the $1^{st}$ app icon 431. In order for the mobile terminal 100 to be released from the object change mode, even if the long touch gesture is applied to another app icon (i.e., the $2^{nd}$ app icon, the $3^{rd}$ app icon, etc.) instead of the $1^{st}$ app icon, the mobile terminal 100 can release the object change mode.

If so, the controller 180 can release the mobile terminal 100 from the object change mode. When the mobile terminal 100 is released from the object change mode, referring to FIG. 15(15-4), the controller 180 can stop displaying the object arrangement grid 405 from the $1^{st}$ region 401 of the touchscreen 400 and stop displaying the object indicator from the $1^{st}$ widget 441.

FIG. 15 describes that the user command is input to enable the $1^{st}$ widget changed from the $1^{st}$ app icon to be located at a cell having no other object located thereat. In the following description, FIG. 16 explains that a user command is input to enable the $1^{st}$ widget changed from the $1^{st}$ app icon to be located at a cell having another object located thereat.

Figure 16:
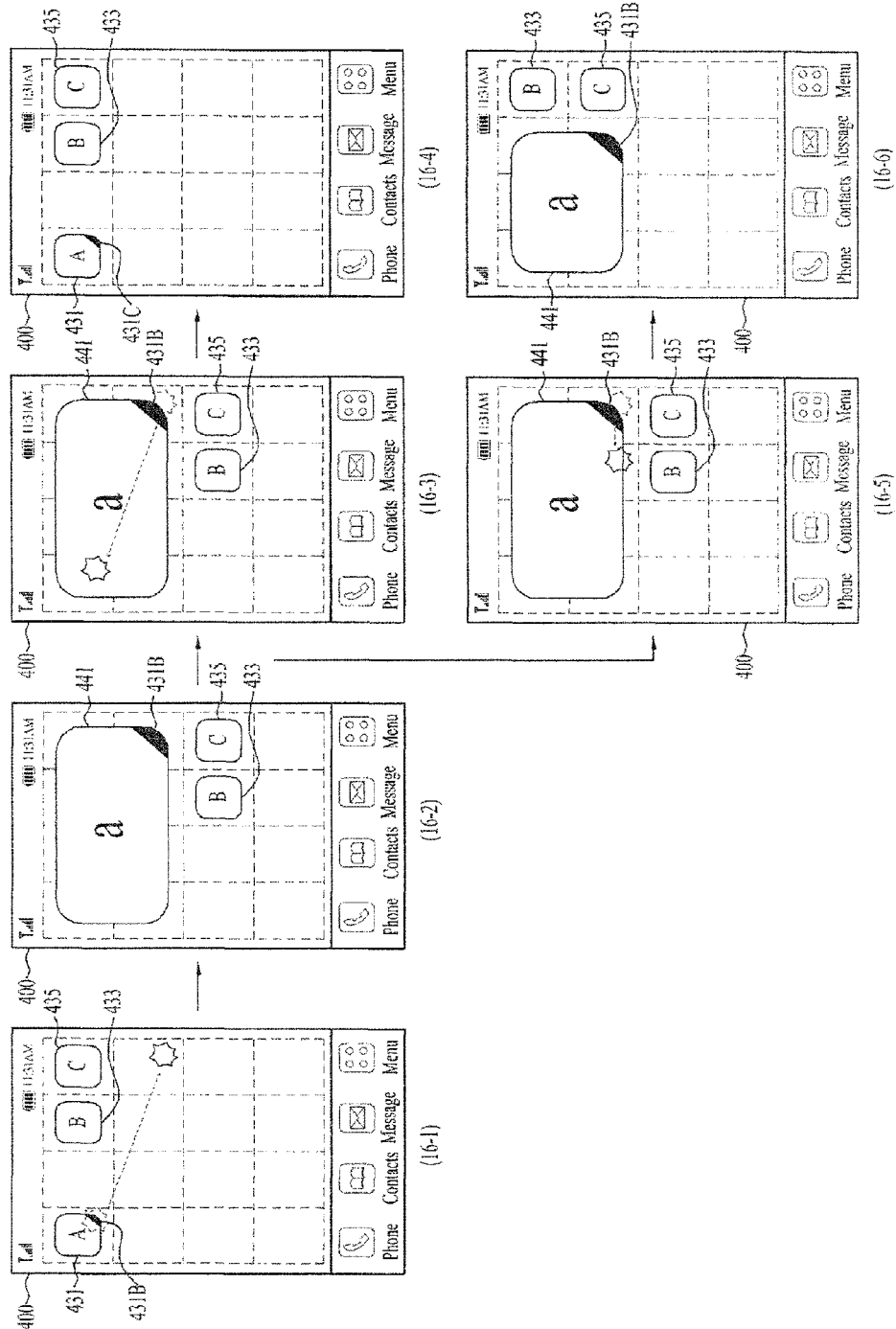

Referring to FIG. 16, the mobile terminal 100 has entered the object change mode. Referring to FIG. 16(16-1), a $1^{st}$ app icon 431, a $2^{nd}$ app icon 433 and a $3^{rd}$ app icon 435 are located at the cell 1-1, the cell 1-3 and the cell 1-4 of the object arrangement grid 405, respectively. As mentioned in the foregoing description, the initial location (or cell) information on locations at which the $1^{st}$ to $3^{rd}$ app icons are arranged at the timing point of entering the object change mode is saved in the memory 160.

Subsequently, a $2^{nd}$ outward direction drag touch gesture may be performed on the $1^{st}$ app icon 431. In this instance, the $2^{nd}$ outward direction drag touch gesture starts from the widget indicator 431B of the $1^{st}$ app icon 431 and extends in an outward direction. In more detail, the $2^{nd}$ outward direction drag touch gesture is a touch gesture for increasing a size of the $1^{st}$ app icon 431 (or for widening a boundary of the $1^{st}$ app icon 431) (e.g., enabling the $1^{st}$ widget 441 changed from the $1^{st}$ app icon 431 to occupy 8 cells (cell 1-1 to cell 2-4)).

Yet, as mentioned in the foregoing description, the $2^{nd}$ app icon 433 and the $3^{rd}$ app icon 435 occupy the cell 1-3 and the cell 1-4, respectively. Hence, in response to the $2^{nd}$ outward direction drag touch gesture, the controller 180 controls the changed $1^{st}$ widget 441 to have a size that occupies 8 cells including the cell 1-1 to the cell 204 and also controls the $2^{nd}$ app icon 433 and the $3^{rd}$ app icon 435 to move to the cell 3-3 and the cell 3-4, respectively. In particular, the $2^{nd}$ and $3^{rd}$ app icons move in a minimum moving distance outside the 8 cells including the cell 1-1 to the cell 2-4.

In doing so, if the mobile terminal 100 is released from the object change mode, the $1^{st}$ widget 441 occupies the cell 101 to the cell 204 and the $2^{nd}$ and $3^{rd}$ app icons 433 and 435 continue occupying the cell 3-3 and the cell 3-4, respectively.

Further, while the object change mode is active in the mobile terminal 100, referring to FIG. 16(16-3), a $1^{st}$ inward direction drag touch gesture may be performed on the $1^{st}$ widget 441. In this instance, the $1^{st}$ inward direction drag touch gesture includes a touch & drag having the same length of the $2^{nd}$ outward direction drag touch gesture in opposite direction. In particular, the $1^{st}$ inward direction drag touch gesture may start from the object indicator 431B of the $1^{st}$ widget 441 to extend in inward direction and be a touch gesture enabling the $1^{st}$ widget 411 to have an original size of the $1^{st}$ app icon 431.

If so, in response to the $1^{st}$ inward direction drag touch gesture, referring to FIG. 16(16-4), the controller 180 restores the $1^{st}$ widget 441 to the $1^{st}$ app icon 431. In particular, referring to FIG. 16(16-4), the restored $1^{st}$ app icon 431 may have the size of occupying the cell 1-1 in the object arrangement grid 405 to correspond to an end point of the $1^{st}$ inward direction drag touch gesture.

When the $1^{st}$ widget 441 is restored to the $1^{st}$ app icon 431, the controller 180 returns the $2^{nd}$ app icon 433 and the $3^{rd}$ app icon 435 to the cell 1-3 and the cell 1-4 with reference to the saved initial location information, respectively.

Meanwhile, when the changed $1^{st}$ widget 441 occupies the cell 1-1 to the cell 2-4, referring to FIG. 16(16-5), a $2^{nd}$ inward direction drag touch gesture may be performed on the $1^{st}$ widget 441. In this instance, the $2^{nd}$ inward direction drag touch gesture starts from the object indicator 431B of the $1^{st}$ widget 441 and extends in an inward direction and is a touch gesture to enable the $1^{st}$ widget 441 to have a size amounting to the cells 1-1 to 1-3 and the cells 2-1 to 2-3.

The $2^{nd}$ inward direction drag touch gesture may also not enable the $1^{st}$ widget 441 to have an original size of the $1^{st}$ app icon 431. Hence, in response to the $2^{nd}$ inward direction drag touch gesture, referring to FIG. 16(16-6), the controller 180 does not change the 1$^{st}$ widget 441 into the 1$^{st}$ app icon 431, but only adjusts its size. In particular, a size of the 1$^{st}$ widget 441 may be adjusted from the size amounting to 8 cells including the cells 1-1 to 2-4 into the size amounting to 6 cells including the cells 1-1 to 1-3 and the cells 2-1 to 2-3 in response to the 2$^{nd}$ inward direction drag touch gesture.

As the size of the 1$^{st}$ widget 441 is reduced, the cell 1-4 and the cell 2-4 remain empty. Hence, considering that the cell 1-4 is the initial location of the 3$^{rd}$ app icon 435, when the size of the 1$^{st}$ widget 441 is reduced, the controller 180 returns the 3$^{rd}$ app icon 435 to the cell 1-4, i.e., the initial location. Considering that the 2$^{nd}$ app icon 433 is closer to the saved initial location (i.e., the cell 1-3) if located at the cell 2-4 rather than the cell 3-3, when the size of the 1$^{st}$ widget 441 is reduced, the controller 180 moves the 2$^{nd}$ app icon 433 to the cell 2-4.

Figure 17:
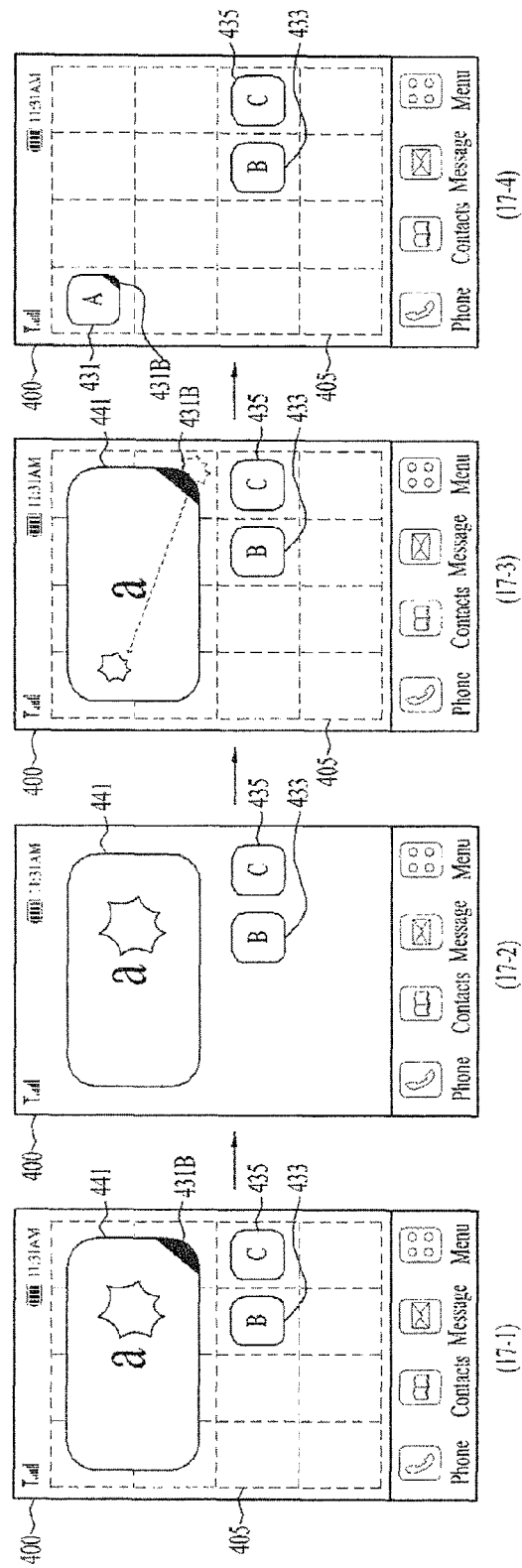

Referring to FIG. 17(17-1), while the active change mode is active in the mobile terminal 100, the 1$^{st}$ widget 441 is arranged to occupy the cells 1-1 to 2-4 and the 2$^{nd}$ app icon 433 an the 3$^{rd}$ app icon 435 are arranged to occupy the cell 3-3 and the cell 3-4, respectively.

Then, a long touch gesture is applied to the 1$^{st}$ widget 441. If so, in response to the long touch gesture applied to the 1$^{st}$ widget 441, the controller 180 releases the mobile terminal 100 from the object change mode. Subsequently, a long touch gesture may be applied to the 1$^{st}$ widget 441 again. If so, in response to the long touch gesture applied to the 1$^{st}$ widget 441 again, the controller 180 can enter the mobile terminal 100 into the object change mode.

The controller 180 may also save the cells 1-1 to 2-4 as the initial location information of the 1$^{st}$ widget 441 in the memory 160 and save the cell 3-3 and the cell 3-4 as the initial location information of the 2$^{nd}$ app icon 433 and the initial location information of the 3$^{rd}$ app icon 435 in the memory 160, respectively.

Referring to FIG. 17(17-3), the aforementioned 1$^{st}$ inward direction drag touch gesture is performed on the 1$^{st}$ widget 441. If so, in response to the 1$^{st}$ inward direction drag touch gesture, referring to FIG. 17(17-4), the controller 180 restores the 1$^{st}$ widget 441 to the 1$^{st}$ app icon 431 that occupies the cell 1-1. This is already explained in the foregoing description and its details are omitted from the following description for clarity.

Even if the 1$^{st}$ widget 441 is restored to the 1$^{st}$ app icon 431, the controller 180 may continue to locate the 2$^{nd}$ app icon 433 and the 3$^{rd}$ app icon 435 at the cell 3-3 and the cell 3-4, which are the initial locations newly saved in the memory 160, respectively.

Referring to FIG. 18(18-1), the 1$^{st}$ app icon 431 is located at the cell 1-1 of the object arrangement grid 405 on the touchscreen 400. In addition, the 2$^{nd}$ widget 443, the 3$^{rd}$ app icon 435, the 4$^{th}$ widget 447 and the 5$^{th}$ widget 449 occupy the rest of the cells (i.e., the cell 1-2 to the cell 4-4) of the object arrangement grid 405.

In doing so, the aforementioned 1$^{st}$ or 2$^{nd}$ outward direction drag touch gesture may be performed on the 1$^{st}$ app icon 431. However, in response to the outward direction drag touch gesture applied to the 1$^{st}$ app icon 431, even if the 1$^{st}$ app icon 431 is intended to be changed into the 1$^{st}$ widget 441 that occupies at least two cells, any empty space for receiving the changed 1$^{st}$ widget 441 therein does not exist in the 1$^{st}$ region 401 of the touchscreen 400.

In this instance, referring to FIG. 18(18-2), in response to the outward direction drag touch gesture, the controller 180 simultaneously displays at least two home screens 400-1 to 400-7 prepared in advance for the mobile terminal 100 on the touchscreen 400. In FIG. 18(18-2), the prepared at least two home screens are seven home screens, by which the present embodiment is non-limited.

Moreover, the controller 180 can usually discriminate the home screens 400-1, 400-4, 400-5 and 400-6, each of which has an empty space for receiving the changed 1$^{st}$ widget 441 therein, from each other. A user can then touch and select one of the home screens 400-1, 400-4, 400-5 and 400-6, each of which has the empty space. If so, the controller 180 may arranges the changed 1$^{st}$ widget 441 on the selected home screen.

On the other hand, there may be no screen having the empty space for receiving the changed 1$^{st}$ widget 441 therein among the at least two home screens. If so, referring to FIG. 18(18-3), the controller 180 may not change the 1$^{st}$ app icon 431 changed into the 1$^{st}$ widget 441 despite that the outward direction drag touch gesture is performed on the 1$^{st}$ app icon 431.

According to the above description, an app icon of a specific application and at least one or more widgets corresponding to the app icon may be associated as default with each other in advance by a manufacturer of the specific application, by which the present embodiment is non-limited. Although an icon and a widget are not associated as a default with each other by a manufacturer, they may be associated with each other in the mobile terminal by a user. Accordingly, embodiments of the present invention provide various effects and/or features.

According to at least one of embodiments of the present invention, when an application is downloaded, an icon and widget downloaded together with the application can be conveniently created on a display unit of a mobile terminal. In particular, since the icon and the widget may be changed into each other in the displayed unit of the mobile terminal, a display space of the display unit can be considerably utilized.

The above concept is applicable to icons and widgets downloaded to the mobile terminal and is also applicable to folders in the mobile terminal, for example.

In addition, the above-described methods can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). Further, the computer may include the controller 180 of the terminal.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A mobile terminal comprising:
a touchscreen;
a wireless communication unit configured to wirelessly communicate with at least one other terminal;
a memory configured to store a specific application; and
a controller configured to:
control the touchscreen to display a first object related to the specific application, the first object having a first size, wherein the specific application can be executed in response to a first touch gesture on the first object, in response to a second touch gesture with respect to the displayed first object, control the touchscreen to display an object indicator indicating that the first object can be changed into a second object related to the specific application, the second object having a second size, and in response to a third touch gesture with respect to the object indicator, change the displayed first object into the second object such that the first object having the first size is visually transformed into the second object having the second size, wherein the first object is an application icon related to the specific application, and the second object is a first widget related to the specific application, and wherein the second touch is different than the first touch, and the third touch is a drag touch gesture.

2. The mobile terminal of claim 1, wherein the second size is bigger than the first size.

3. The mobile terminal of claim 2, wherein when the third touch gesture or a fourth touch gesture is performed with respect to the second object, the controller is further configured to control the touchscreen to visually change the second object into a third object related to the specific application, the third object having a third size.

4. The mobile terminal of claim 3, wherein the third size is bigger than the second size.

5. The mobile terminal of claim 1, wherein when the third touch gesture or a fourth touch gesture is performed with respect to the second object, the controller is further configured to control the touchscreen to change the second object into the first object.

6. The mobile terminal of claim 3, wherein when the third touch gesture or the fourth touch gesture is performed on the third object, the controller is further configured to control the touchscreen to visually change the third object into the second object.

7. The mobile terminal of claim 3, wherein when the third touch gesture or the fourth touch gesture is performed on the third object, the controller is further configured to control the touchscreen to visually change the third object into the first object.

8. The mobile terminal of claim 1, wherein the controller is further configured to control the touchscreen to display the object indicator as being overlapped on the first object or near the first object.

9. The mobile terminal of claim 8, wherein the object indicator is displayed at a lower right corner of the first object.

10. The mobile terminal of claim 1, wherein the controller is further configured to rearrange other display objects displayed on the touchscreen when the displayed first object is changed into the second object.

11. The mobile terminal of claim 3,
wherein the first widget displays first information thereon, the first information being a part of second information displayed according to the executed specific application.

12. The mobile terminal of claim 11, wherein the third object is a second widget related to the specific application.

13. A method of controlling a mobile terminal, the method comprising:
storing a specific application in a memory associated with the mobile terminal;
displaying, via a touchscreen associated with the mobile terminal, a first object related to the specific application, the first object having a first size, wherein the specific application can be executed in response to a first touch gesture on the first object;

in response to a second touch gesture with respect to the displayed first object, displaying, via the touchscreen, an object indicator indicating that the first object can be changed into a second object related to the specific application, the second object having a second size; and in response to a third touch gesture with respect to the object indicator, changing the displayed first object into the second object such that the first object having the first size is visually transformed into the second object having the second size, wherein the first object is an application icon related to the specific application, and the second object is a first widget related to the specific application, and wherein the second touch is different than the first touch, and the third touch is a drag touch gesture.

14. The method of claim 13, wherein the second size is bigger than the first size.

15. The method of claim 14, further comprising visually changing the second object into a third object related to the specific application, the third object having a third size, when the third touch gesture or a fourth touch gesture is performed with respect to the second object.

16. The method of claim 13, wherein the third size is bigger than the second size.

17. The method of claim 13, further comprising changing the second object into the first object when the third touch gesture or a fourth touch gesture is performed with respect to second object.

18. The method of claim 15, further comprising visually changing the third object into the second object when the third touch gesture or the fourth touch gesture is performed on the third object.

19. The method of claim 15, further comprising visually changing the third object into the first object wherein when the third touch gesture or the fourth touch gesture is performed on the third object.

20. The method of claim 13, wherein the object indicator is displayed as being overlapped on the first object or near the first object.

21. The method of claim 20, wherein the object indicator is displayed at a lower right corner of the first object.

22. The method of claim 13, further comprising rearranging other display objects displayed on the touchscreen when the displayed first object is changed into the second object.

23. The method of claim 15,
wherein the first widget displays first information thereon, the first information being a part of second information displayed according to the executed specific application.

24. The method of claim 23, wherein the third object is a second widget related to the specific application.

25. A mobile terminal comprising:
a touchscreen;
a wireless communication unit configured to wirelessly communicate with at least one other terminal;
a memory configured to store a plurality of objects including a widget related to a specific application; and
a controller configured to:
control the touchscreen to display the plurality of objects,
in response to a first touch gesture performed with respect to the widget, control the touchscreen to display an indicator on the widget, wherein the indicator indicates that the widget can be resized, in response to a second touch gesture performed with respect to the indicator, control the touchscreen to resize the widget based on a drag distance of the second touch gesture, and control the touchscreen to rearrange a rest of the plurality of objects in accordance with the resized widget, wherein the second touch gesture includes an outward or inward direction drag touch gesture for the widget, and wherein the outward direction drag touch gesture for the widget starts from the indicator of the widget.

26. The mobile terminal of claim 25, wherein the controller is further configured to control the touchscreen to display the indicator as being overlapped on the widget or near the widget.

27. The mobile terminal of claim 26, wherein the object indicator is displayed at a lower right corner of the widget.

28. The mobile terminal of claim 25, wherein at least one of the rest of the plurality of objects move such that the rearranged rest of the plurality of objects are prevented from being overlapped on the resized widget.

29. A method of controlling a mobile terminal, the method comprising:

storing a plurality of objects including a widget related to a specific application in a memory associated with the mobile terminal;

displaying, via a touchscreen associated with the mobile terminal, the plurality of objects;

in response to a first touch gesture performed with respect to the widget, displaying, via the touchscreen, an indicator on the widget, wherein the indicator indicates that the widget can be resized;

in response to a second touch gesture performed with respect to the indicator, resizing the widget based on a drag distance of the second touch gesture; and rearranging a rest of the plurality of objects in accordance with the resized widget, wherein the second touch gesture includes an outward or inward direction drag touch gesture for the widget, and wherein the outward direction drag touch gesture for the widget starts from the indicator of the widget.

30. The method of claim 29, wherein the indicator is displayed as being overlapped on the widget or near the widget.

31. The method of claim 30, wherein the object indicator is displayed at a lower right corner of the widget.

32. The method of claim 29, wherein at least one of the rest of the plurality of objects move such that the rearranged rest of the plurality of objects are prevented from being overlapped on the resized widget.

33. A mobile terminal comprising:

a wireless communication unit configured to wirelessly communicate with at least one other terminal;

a touchscreen;

a memory configured to store a specific application; and a controller configured to:

control the touchscreen to display an application icon related to the specific application, wherein the specific application can be executed in response to a first touch gesture on the application icon;

control the touchscreen to display a widget indicator in response to a second touch gesture on the application icon, the widget indicator indicating the displayed application icon can be changed into a first widget related to the specific application on the touchscreen; and when receiving a third touch gesture with respect to the widget indicator, change the displayed application icon into the first widget having a first size on the touchscreen such that the application icon is visually transformed into the first widget having the first size, wherein the first widget displays first information thereon, the first information being a part of second information displayed according to the executed specific application.

34. The mobile terminal of claim 33, wherein the controller is further configured to rearrange other display objects displayed on the touchscreen when the displayed application icon is changed into the first widget.

35. A method of controlling a mobile terminal, the method comprising:

storing a specific application in a memory associated with the mobile terminal;

displaying, via a touchscreen associated with the mobile terminal, an application icon related to the specific application, wherein the specific application can be executed in response to a first touch gesture on the application icon;

displaying, via the touchscreen, a widget indicator in response to a second touch gesture on the application icon, the widget indicator indicating the displayed application icon can be changed into a first widget related to the specific application on the touchscreen; and when receiving a third touch gesture with respect to the widget indicator, changing the displayed application icon into the first widget having a first size on the touchscreen such that the application icon is visually transformed into the first widget having the first size, wherein the first widget displays first information thereon, the first information being a part of second information displayed according to the executed specific application.

36. The method of claim 35, further comprising rearranging other display objects displayed on the touchscreen when the displayed application icon is changed into the first widget.

* * * * *